(12) United States Patent
Burns et al.

(10) Patent No.: US 9,952,003 B2
(45) Date of Patent: Apr. 24, 2018

(54) STEAM GENERATION

(71) Applicants: Michael Alan Burns, Seaford (GB); Paul Andrew Burns, Seaford (GB)

(72) Inventors: Michael Alan Burns, Seaford (GB); Paul Andrew Burns, Seaford (GB)

(73) Assignee: Clean Thermodynamic Energy Conversion Ltd, East Sussex (GB)

( * ) Notice: Subject to any disclaimer, the term of this patent is extended or adjusted under 35 U.S.C. 154(b) by 0 days.

(21) Appl. No.: 14/447,730

(22) Filed: Jul. 31, 2014

(65) Prior Publication Data

US 2015/0136374 A1    May 21, 2015

Related U.S. Application Data

(63) Continuation of application No. PCT/GB2013/000039, filed on Jan. 31, 2013.

(30) Foreign Application Priority Data

Jan. 31, 2012 (GB) .................................. 1201669.7
Jan. 31, 2012 (GB) .................................. 1201670.5
(Continued)

(51) Int. Cl.
F28D 1/04         (2006.01)
F28F 1/24         (2006.01)
(Continued)

(52) U.S. Cl.
CPC ............. F28F 1/24 (2013.01); B23K 1/0012 (2013.01); B23P 15/26 (2013.01); F01K 13/00 (2013.01);
(Continued)

(58) Field of Classification Search
CPC ........ F28D 1/05366; F28D 9/02; F28D 1/126; F28D 3/025; F28D 1/024; F28D 1/0477; F28D 1/325
(Continued)

(56) References Cited

U.S. PATENT DOCUMENTS 1,559,949 A    11/1925  Feldmeier
1,561,013 A    11/1925  Odendahl
(Continued)

FOREIGN PATENT DOCUMENTS

CN    201547745 U    8/2010
CN    102080818 A    6/2011
(Continued)

OTHER PUBLICATIONS

International Search Report for corresponding International App. No. PCT/GB2013/000039 dated Oct. 11, 2013.

*Primary Examiner* — Davis Hwu
(74) *Attorney, Agent, or Firm* — Renner, Otto, Boisselle & Sklar, LLP

(57) ABSTRACT

A heat exchanger assembly, comprising: heat exchanger pipework which comprises a plurality of elongate tube elements which extend in spaced relation and a plurality of pipe end couplings which fluidly connect open ends of respective tube elements, wherein the pipe end couplings each comprise a main body part to which the open ends of the respective tube elements are fixed, and an enclosure part which is fixed to the main body part and provides a closed fluid connection between the open ends of the respective tube elements; and a plurality of fins which extend in spaced relation and optionally substantially orthogonally to the tube elements, wherein the fins each comprise a sheet element, optionally a single, continuous sheet element, which includes a plurality of apertures through which extend respective ones of the tube elements, and a plurality of fin (Continued)

coupling elements which are located within respective ones of the fin apertures to interface the tube elements to the sheet elements.

35 Claims, 28 Drawing Sheets

(30) Foreign Application Priority Data

| Jan. 31, 2012 | (GB) | ................................... | 1201671.3 |
|---|---|---|---|
| Jan. 31, 2012 | (GB) | ................................... | 1201672.1 |
| Jan. 31, 2012 | (GB) | ................................... | 1201673.9 |
| Jan. 31, 2012 | (GB) | ................................... | 1201674.7 |

(51) Int. Cl.

| F22B 1/18 | (2006.01) |
|---|---|
| F22B 37/10 | (2006.01) |
| F22G 1/00 | (2006.01) |
| F22G 1/16 | (2006.01) |
| F22G 3/00 | (2006.01) |
| F28F 9/26 | (2006.01) |
| F28F 1/32 | (2006.01) |
| F28D 7/16 | (2006.01) |
| B23K 1/00 | (2006.01) |
| F28F 9/013 | (2006.01) |
| F28D 7/02 | (2006.01) |
| F28D 7/06 | (2006.01) |
| B23P 15/26 | (2006.01) |
| F01K 13/00 | (2006.01) |
| F22G 1/02 | (2006.01) |

(52) U.S. Cl.
CPC ............. *F22B 1/18* (2013.01); *F22B 37/101* (2013.01); *F22G 1/00* (2013.01); *F22G 1/02* (2013.01); *F22G 1/16* (2013.01); *F22G 3/002* (2013.01); *F28D 7/024* (2013.01); *F28D 7/06* (2013.01); *F28D 7/1623* (2013.01); *F28F 1/32* (2013.01); *F28F 9/013* (2013.01); *F28F 9/26* (2013.01); *Y10T 29/4938* (2015.01); *Y10T 29/49378* (2015.01)

(58) Field of Classification Search
USPC .......................... 165/150, 151, 173, 175, 182
See application file for complete search history.

(56) References Cited

U.S. PATENT DOCUMENTS

| 1,617,519 | A | | 2/1927 | Hartmann | |
|---|---|---|---|---|---|
| 1,768,222 | A | | 6/1930 | Uhde | |
| 1,776,135 | A | | 9/1930 | Arthur | |
| 1,925,646 | A | | 9/1933 | Rakestraw | |
| 1,943,557 | A | | 1/1934 | Ruthenburg et al. | |
| 2,212,542 | A | | 8/1940 | Jones | |
| 2,342,616 | A | | 2/1944 | O'Brien | |
| 3,397,741 | A | * | 8/1968 | Addison | ................. F28F 1/325 |
| | | | | | 165/151 |
| 3,430,692 | A | | 3/1969 | Karmazin | |
| 3,687,194 | A | | 8/1972 | Scholl | |
| 4,054,107 | A | | 10/1977 | Horlitz | |
| 4,142,581 | A | | 3/1979 | Yoshitomi et al. | |
| 4,382,379 | A | | 5/1983 | Kelly | |
| 4,529,212 | A | | 7/1985 | Beckmann | |
| 4,602,500 | A | | 7/1986 | Kelly | |
| 5,626,103 | A | | 5/1997 | Haws et al. | |
| 5,787,844 | A | | 8/1998 | Paju | |
| 6,367,313 | B1 | | 4/2002 | Lubyk | |
| 2003/0000686 | A1 | * | 1/2003 | Kester | ..................... F28F 1/325 |
| | | | | | 165/151 |
| 2005/0194120 | A1 | | 9/2005 | Lomax et al. | |
| 2007/0163764 | A1 | * | 7/2007 | Kaga | ....................... F28F 1/325 |
| | | | | | 165/151 |
| 2008/0000619 | A1 | | 1/2008 | Zhou et al. | |
| 2009/0145587 | A1 | * | 6/2009 | Young | .................. B21D 53/085 |
| | | | | | 165/151 |
| 2010/0044023 | A1 | | 2/2010 | Canales et al. | |
| 2010/0051247 | A1 | * | 3/2010 | Sogabe | .................. B21D 53/08 |
| | | | | | 165/151 |

FOREIGN PATENT DOCUMENTS

| DE | 741418 A | 11/1943 |
|---|---|---|
| DE | 2552690 A | 11/1975 |
| DE | 39 18 610 A1 | 12/1990 |
| DE | 4042057 A | 7/1991 |
| FR | 2670572 A | 6/1992 |
| GB | 303172 | 12/1928 |
| GB | 991914 | 5/1965 |
| GB | 1309900 | 3/1973 |
| GB | 2102966 A | 2/1983 |
| JP | 58/190698 A | 11/1983 |
| JP | 58/209436 A | 12/1983 |
| JP | S60 194291 A | 10/1985 |
| RO | 113392 B | 6/1998 |

* cited by examiner

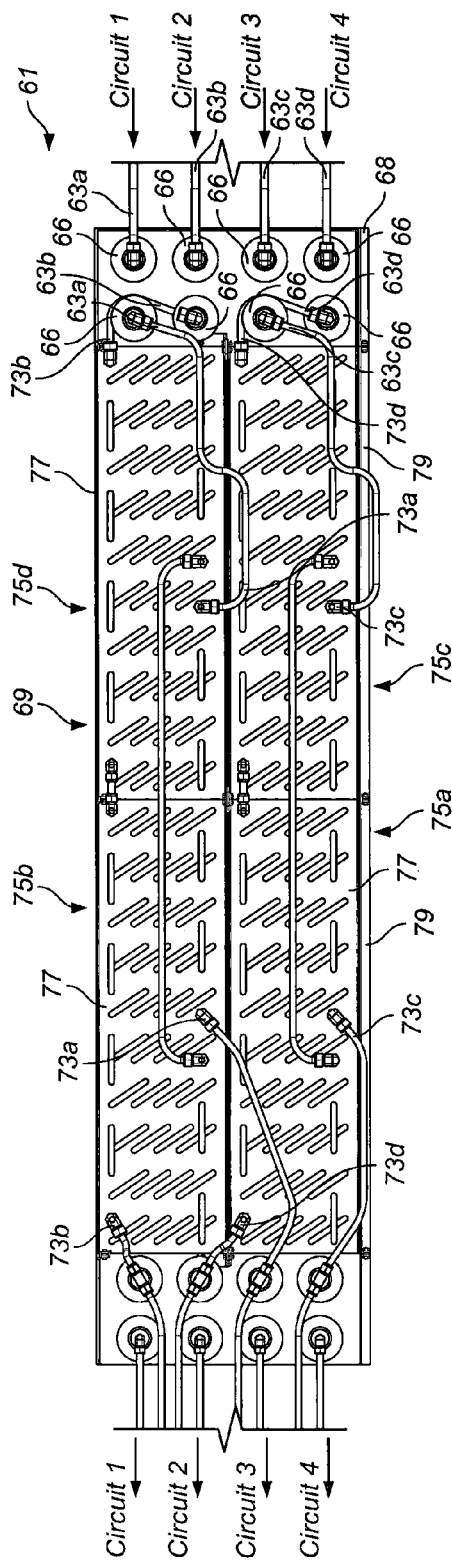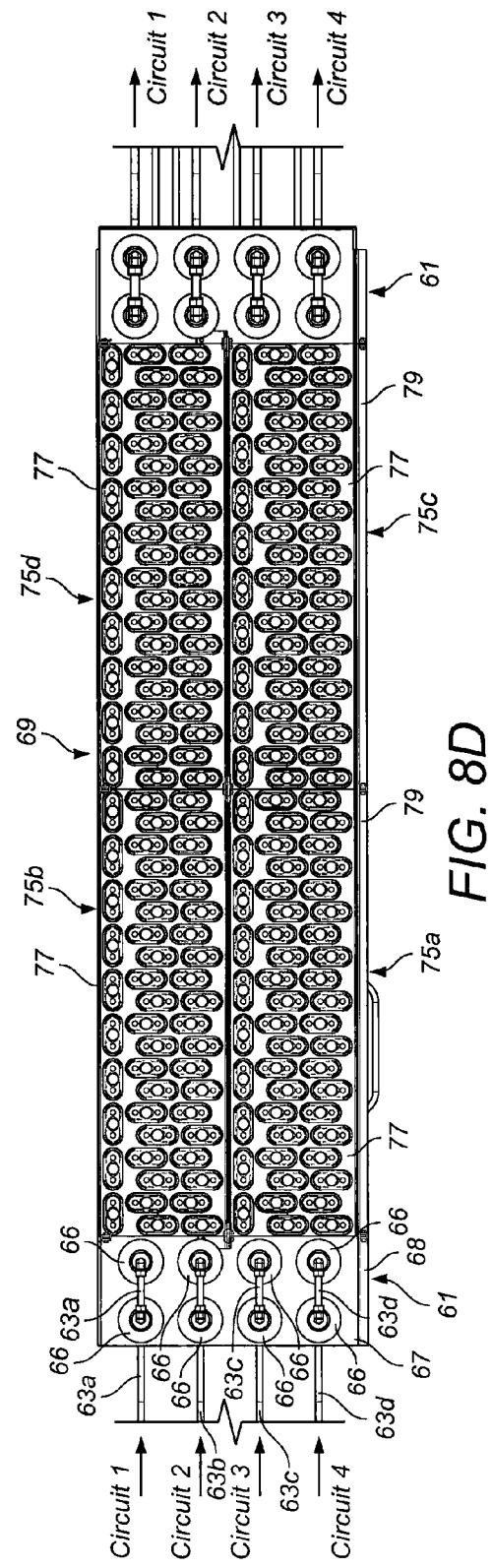

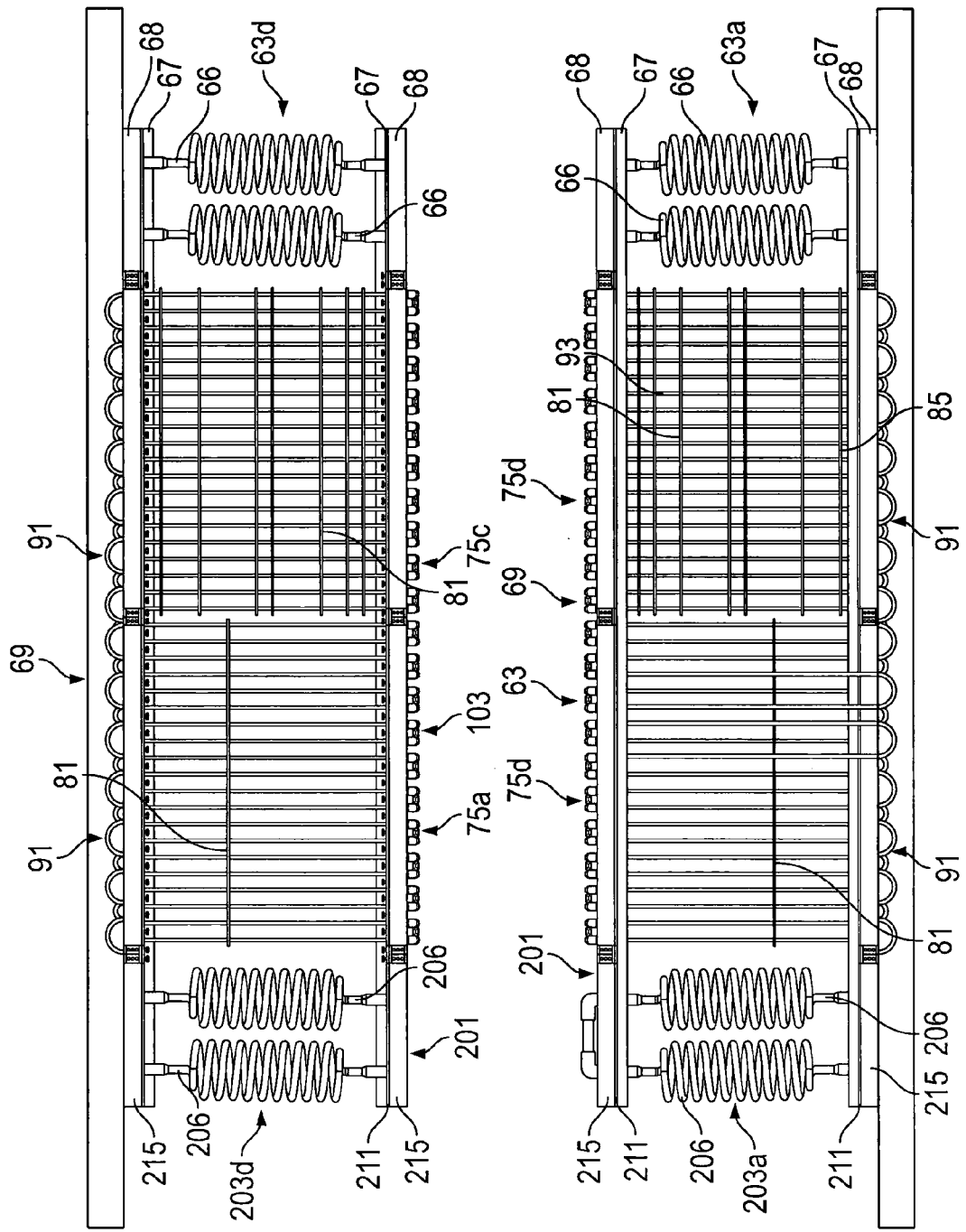

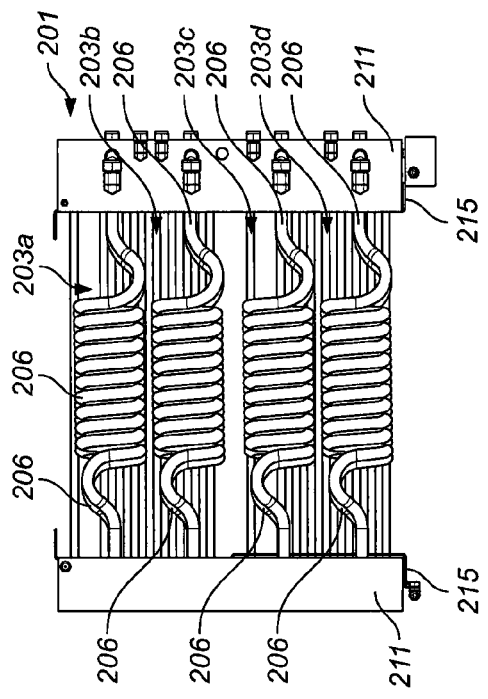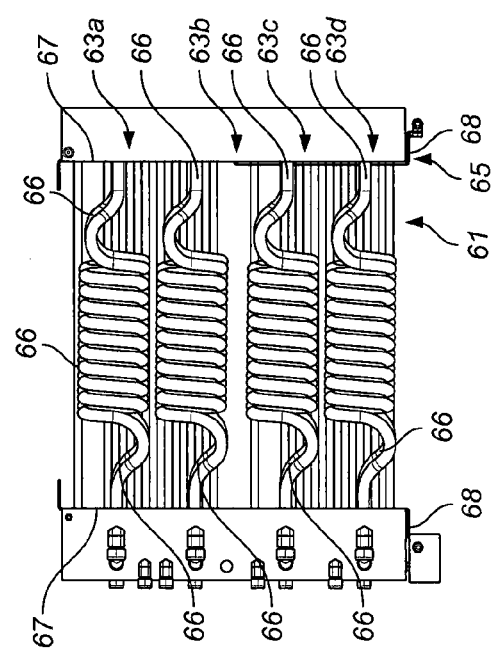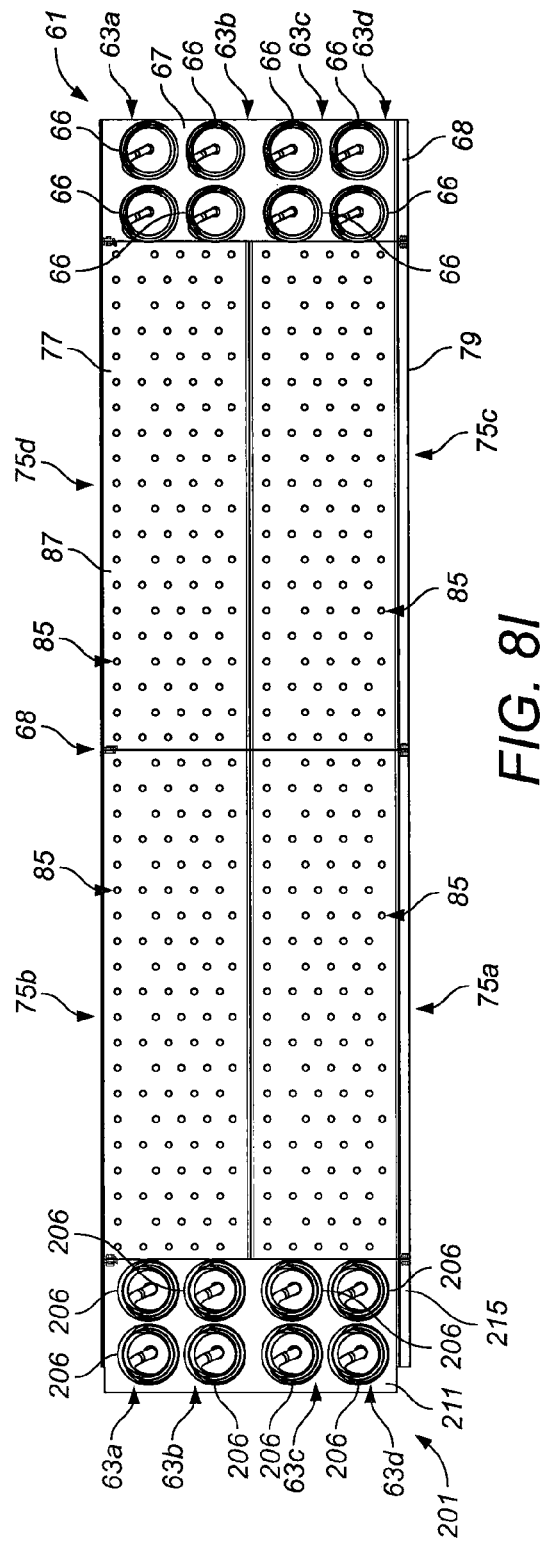

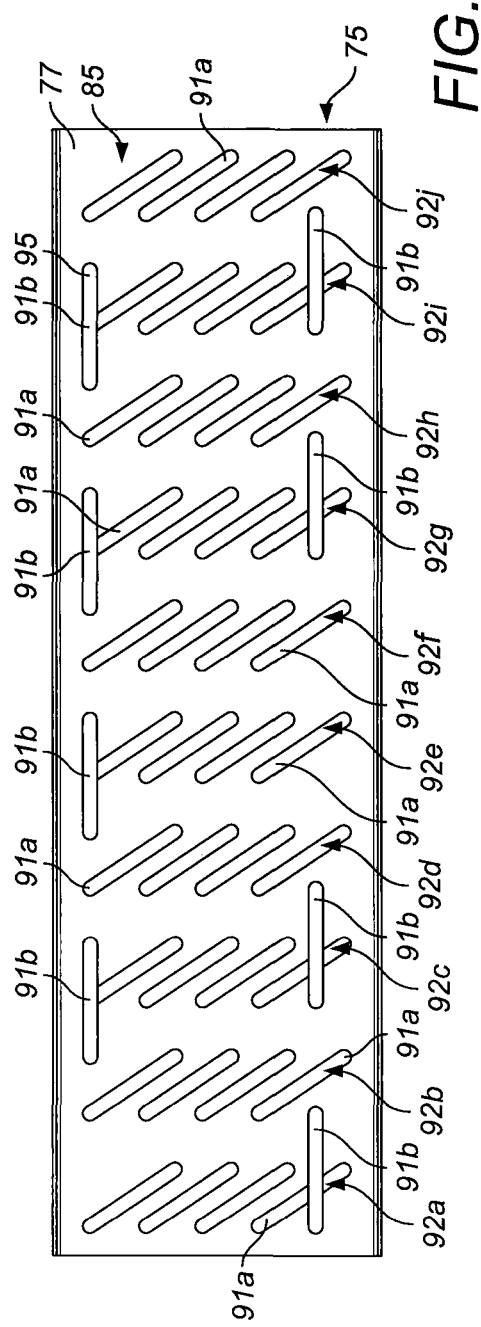
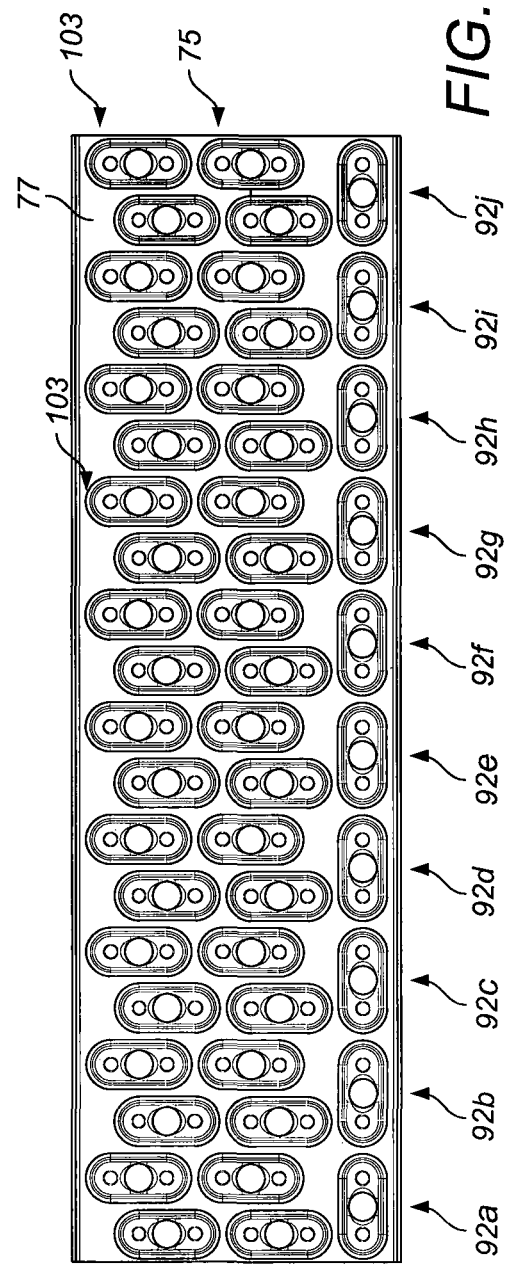

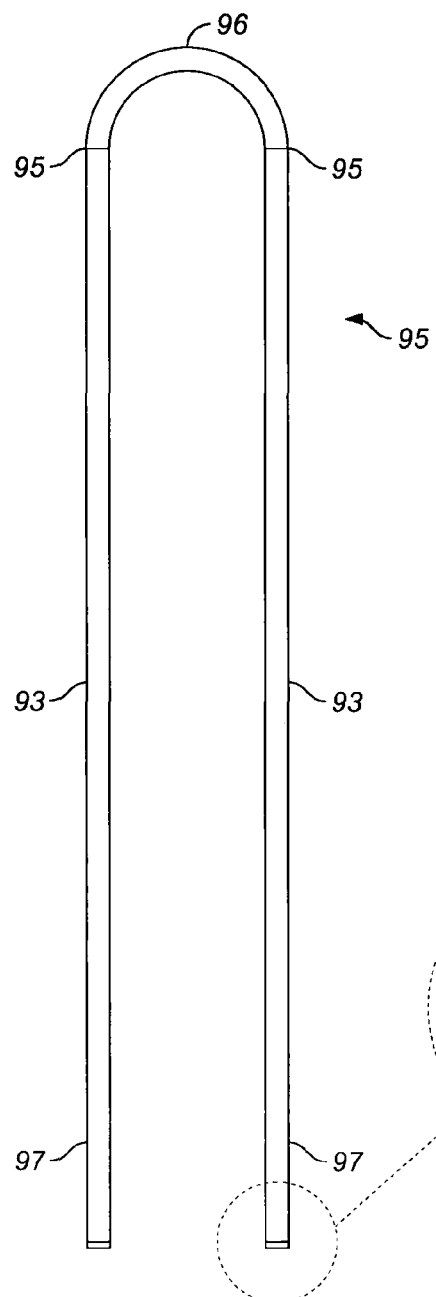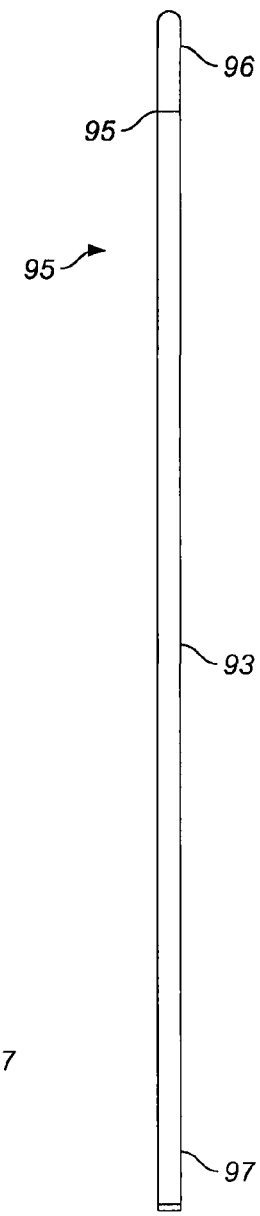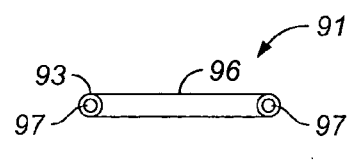
FIG. 10A
FIG. 10B
FIG. 10C

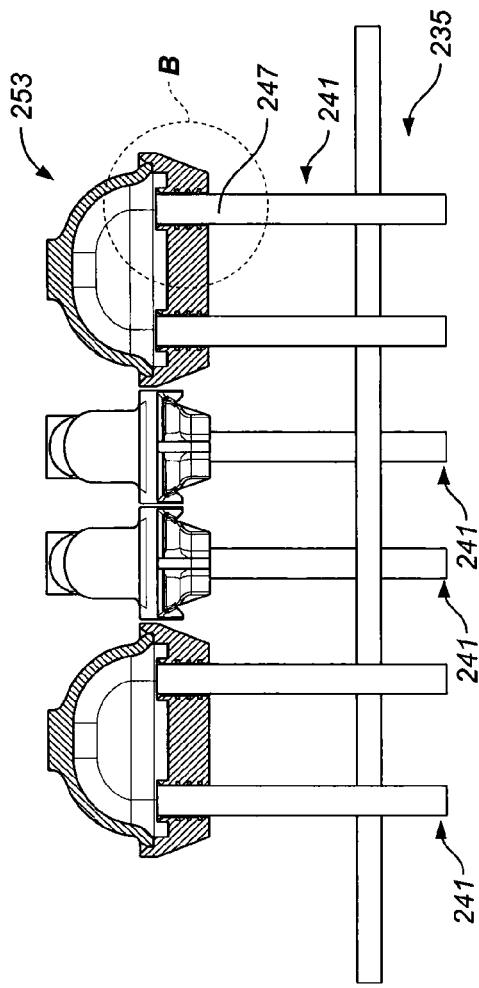
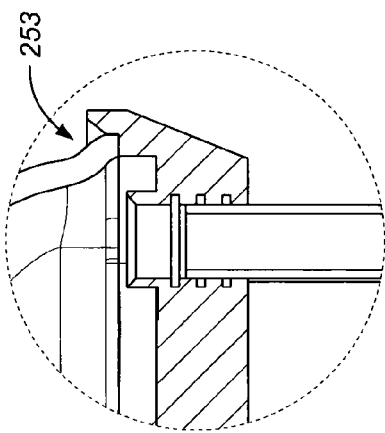
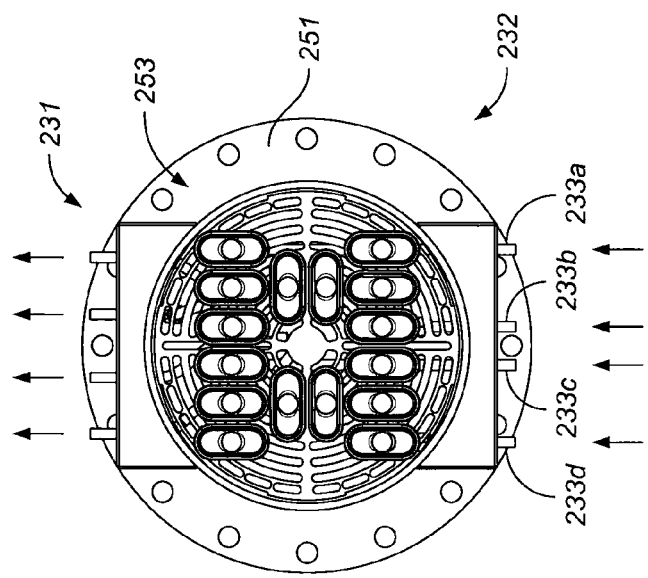
FIG. 17F
FIG. 17G
FIG. 17E

STEAM GENERATION

RELATED APPLICATION DATA

This application is a continuation of International Patent Application No. PCT/GB2013/000039 filed Jan. 31, 2013, which claims priority to United Kingdom Patent Application Nos. 1201669.7, 1201670.5, 1201671.3, 1201673.9, 1201674.7 and 1201672.1 all of which were filed on Jan. 31, 2012, which are all hereby incorporated herein by reference in their entirety.

The present invention relates to a steam generator which generates superheated fluid from a stream of heated gas, and a power generation system which incorporates such a steam generator to generate power, typically electricity using an electrical generator.

The present invention has particular application to any kind of burner, such as a biomass burner, or any kind of combustion engine, such as a landfill anaerobic digestion gas engine, a methane burning engine, a diesel engine, a marine engine and a coal gas engine.

In one aspect the present invention provides a heat exchanger assembly, comprising: heat exchanger pipework which comprises a plurality of elongate tube elements which extend in spaced relation; and a plurality of fins which extend in spaced relation and optionally substantially orthogonally to the tube elements, wherein the fins each comprise a sheet element, optionally a single, continuous sheet element, which includes a plurality of apertures through which extend respective ones of the tube elements, and a plurality of fin coupling elements which are located within respective ones of the fin apertures to interface the tube elements to the sheet elements.

In another aspect the present invention provides a fin for a heat exchanger assembly, the fin comprising: a sheet element, optionally a single, continuous sheet element, which includes a plurality of apertures through which extend respective ones of the tube elements; and a plurality of fin coupling elements which are fabricated separately of the fin sheet element and located within respective ones of the fin apertures to interface the tube elements to the sheet elements.

In a further aspect the present invention provides a method of manufacturing a heat exchanger assembly, comprising the steps of: providing a plurality of tube elements, at least one ends of which are open; arranging the tube elements to extend in spaced relation with a defined pattern, with the open ends of the tube elements extending to one common end; providing a plurality of sheet elements, optionally single, continuous sheet elements, which each include a plurality of apertures; providing a plurality of fin coupling elements, each comprising a body part which includes an aperture, and a flange which extends from the fin body part; locating a fin sheet element over the tube elements, by passing the open ends of the tube elements through the respective fin apertures in the fin sheet element; locating a fin coupling element over each of the open ends of the tube elements, with the flange of each fin coupling element being located in the respective fin aperture in the fin sheet element; repeating the fin sheet element locating and the fin coupling element locating steps to build up a stack of fins along a length of the tube elements, providing a heat exchanger arrangement; and brazing the heat exchanger arrangement, with each of the tube elements being thermally connected to each of the sheet elements by the respective fin coupling elements.

In a still further aspect the present invention provides a heat exchanger assembly, comprising: heat exchanger pipework which comprises a plurality of elongate tube elements which extend in spaced relation, and a plurality of pipe end couplings which fluidly connect open ends of respective tube elements, wherein the pipe end couplings each comprise a main body part to which the open ends of the respective tube elements are fixed, and an enclosure part which is fixed to the main body part and provides a closed fluid connection between the open ends of the respective tube elements; and a plurality of fins which extend in spaced relation and optionally substantially orthogonally to the tube elements.

In a yet further aspect the present invention provides a pipe end coupling for fluidly connecting open ends of tube elements, the pipe end coupling comprising: a main body part to which open ends of tube elements are fixed, wherein the main body part comprises a body, which includes a flange which encloses a surface, and first and second bores which extend to the surface and provide fluid communication thereto and to which the open ends of the tube elements are fixed; and an enclosure part which is fixed to the main body part and provides a closed fluid connection between the open ends of the tube elements.

In yet another aspect the present invention provides a method of manufacturing a heat exchanger assembly, comprising the steps of: providing a plurality of tube elements, at least one ends of which are open; arranging the tube elements to extend in spaced relation with a defined pattern, with the open ends of the tube elements extending to one common end; providing a plurality of sheet elements, optionally single, continuous sheet elements, which each include a plurality of apertures; providing a plurality of fin coupling elements, each comprising a body part which includes an aperture, and a flange which extends from the fin body part; locating a fin sheet element over the tube elements, by passing the open ends of the tube elements through the respective fin apertures in the fin sheet element; locating a fin coupling element over each of the open ends of the tube elements, with the flange of each fin coupling element being located in the respective fin aperture in the fin sheet element; repeating the fin sheet element locating, the fin coupling element locating and the brazing material locating steps to build up a stack of fins along a length of the tube elements, providing a heat exchanger arrangement; brazing the heat exchanger arrangement, with each of the tube elements being thermally connected to each of the sheet elements by the respective fin coupling elements; providing a plurality of pipe end couplings, wherein the pipe end couplings each comprise a main body part which comprises a body, which includes a flange which encloses a surface, and first and second bores which extend to the surface and provide for fluid communication thereto, and an enclosure part which, when fixed to the main body part, provides a closed fluid connection between the first and second bores; and fixing pipe end couplings to the open ends of the tube elements of adjacent tube sections, wherein the pipe end coupling fixing step comprises, for each pipe end coupling, the steps of: fixing the open ends of the tube elements in the respective bores of the main body part; and fixing the enclosure part to the main body part, such as to provide a closed fluid connection between the open ends of the tube elements.

Preferred embodiments of the present invention will now be described hereinbelow by way of example only with reference to the accompanying drawings, in which:

FIG. 1 schematically represents a power generation system in accordance with a preferred embodiment of the present invention;

FIGS. 2(a) and (b) illustrate operation of the by-pass valve of the steam generator of the power generation system of FIG. 1;

Figure 1:
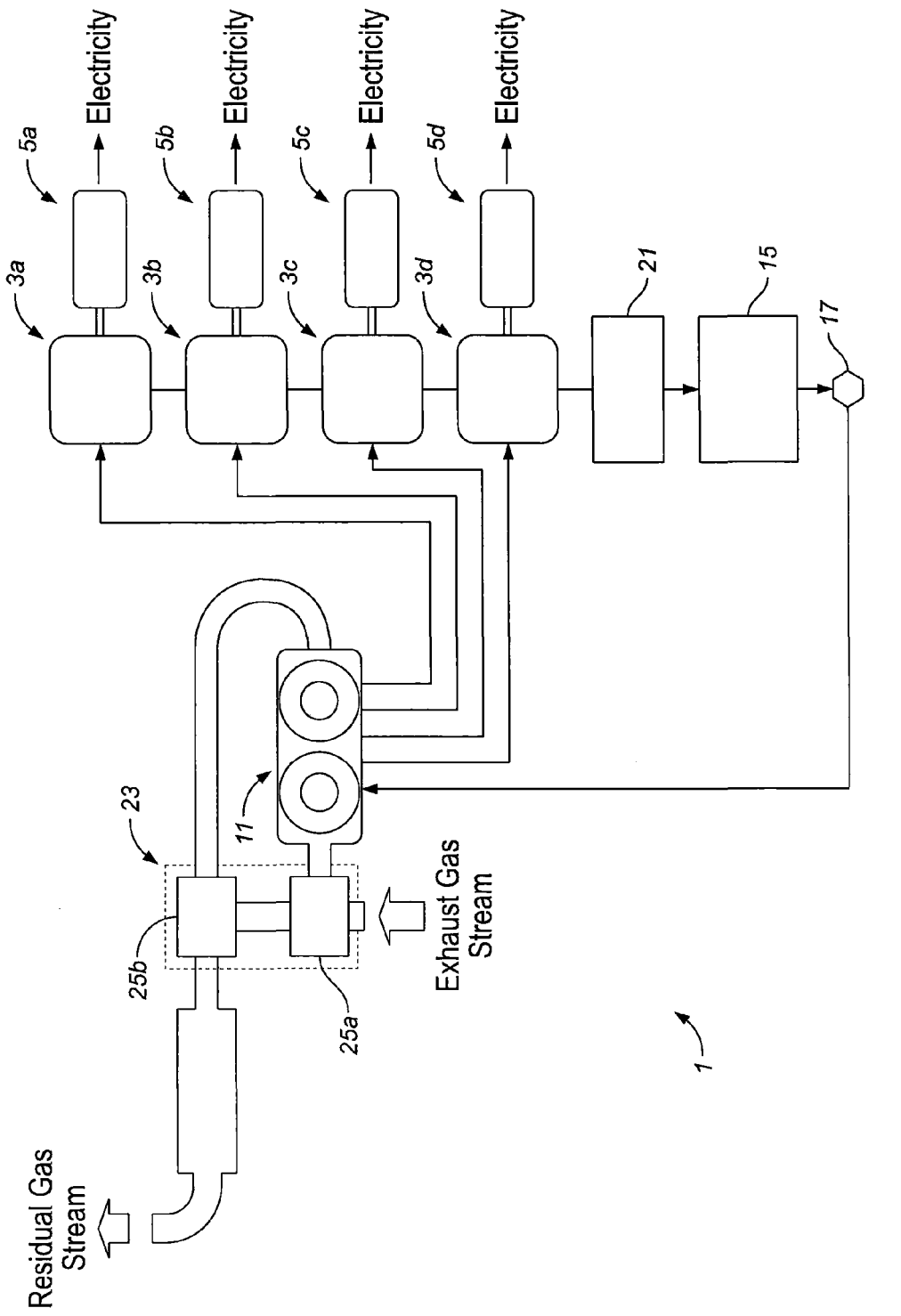
Figure 12A:
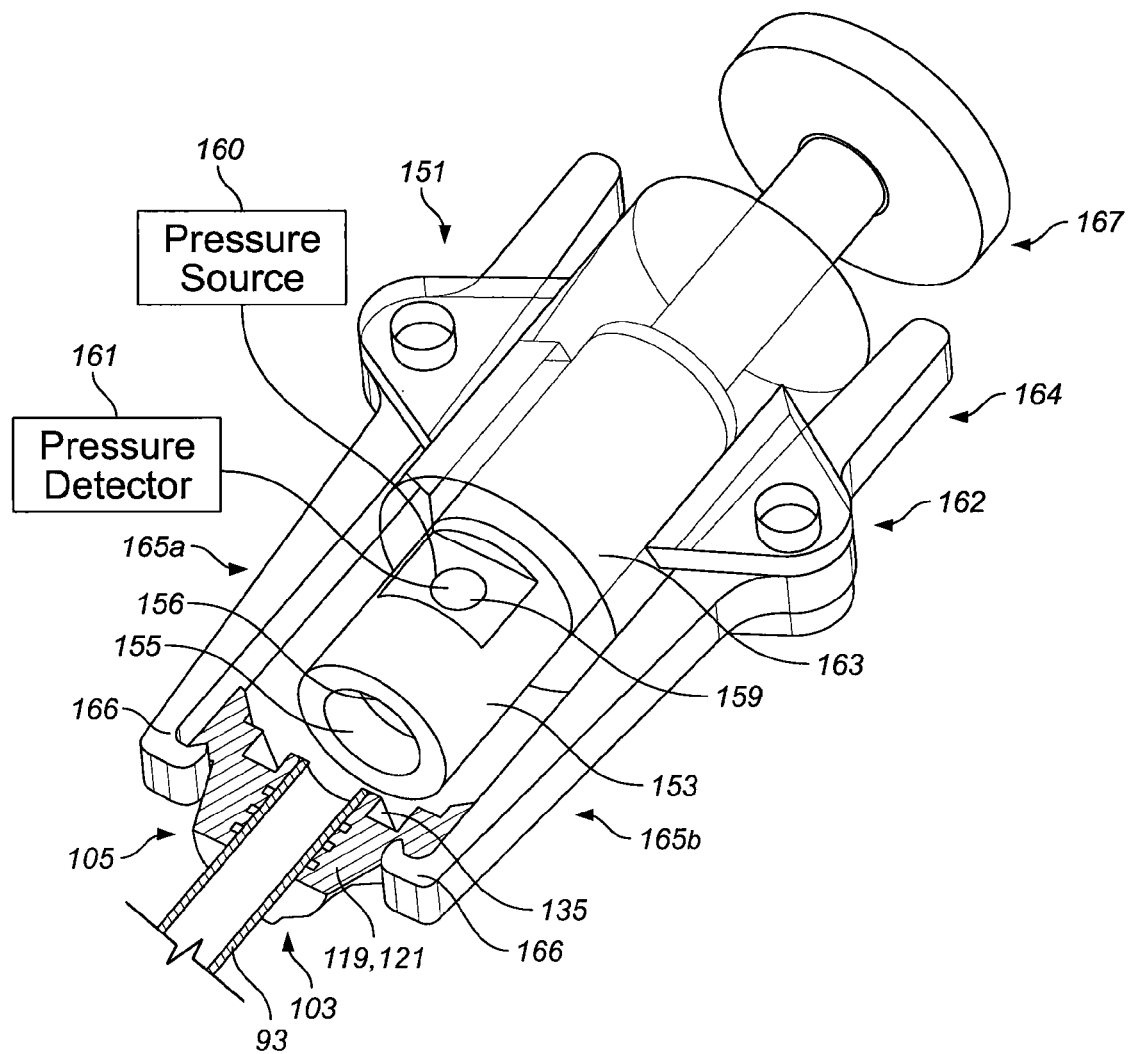
Figure 12B:
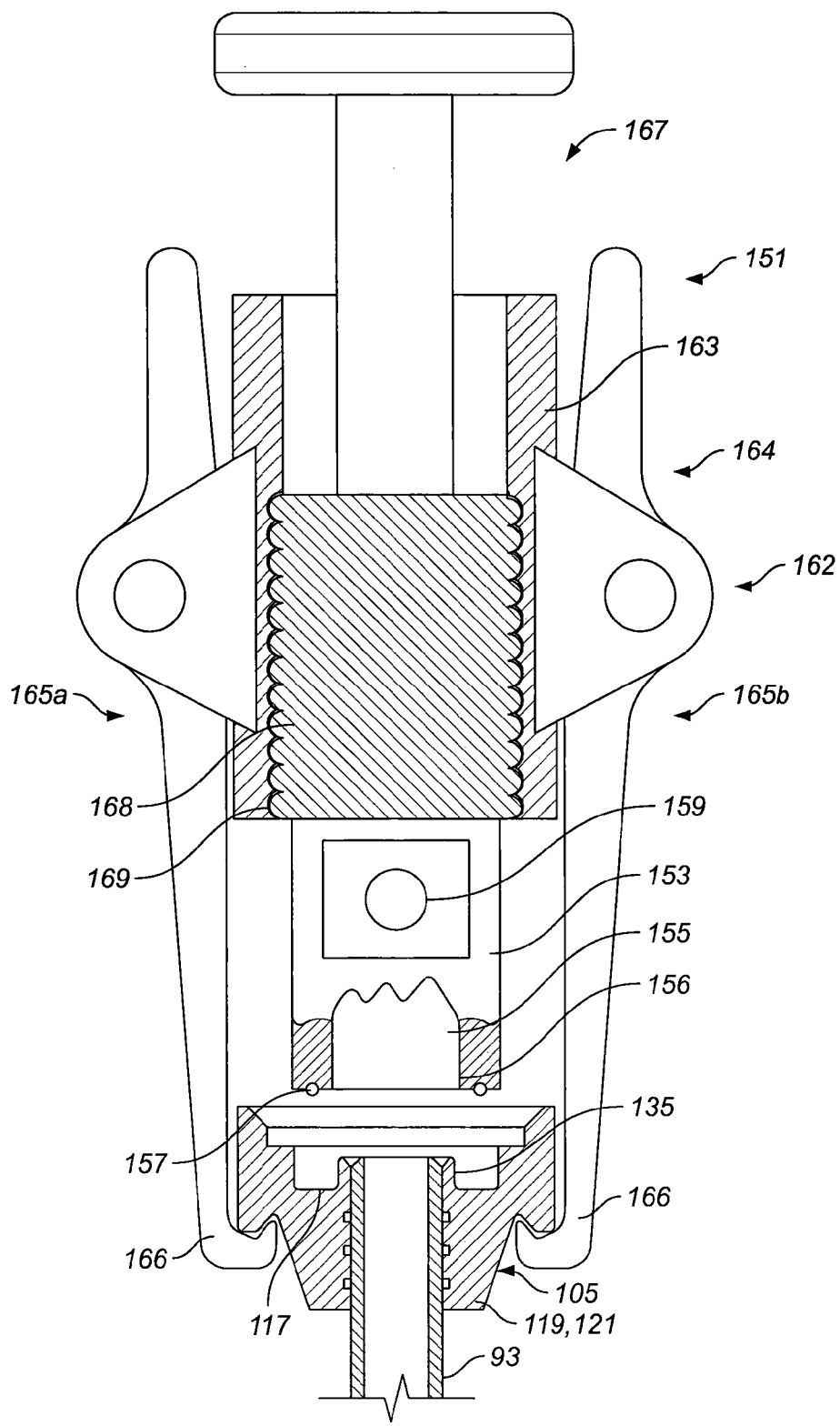
Figure 13A:
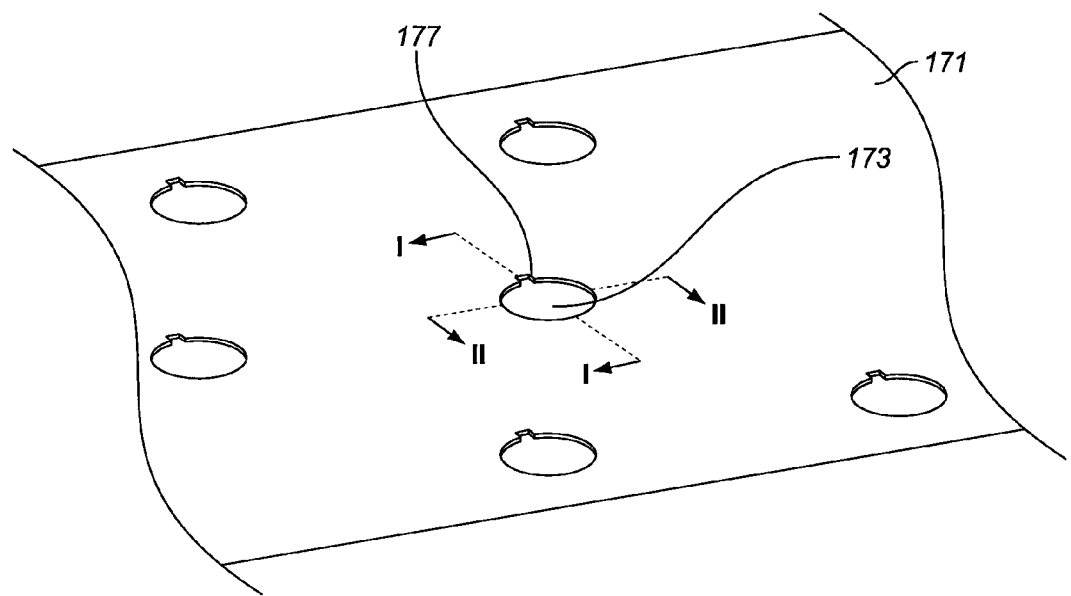
Figure 15:
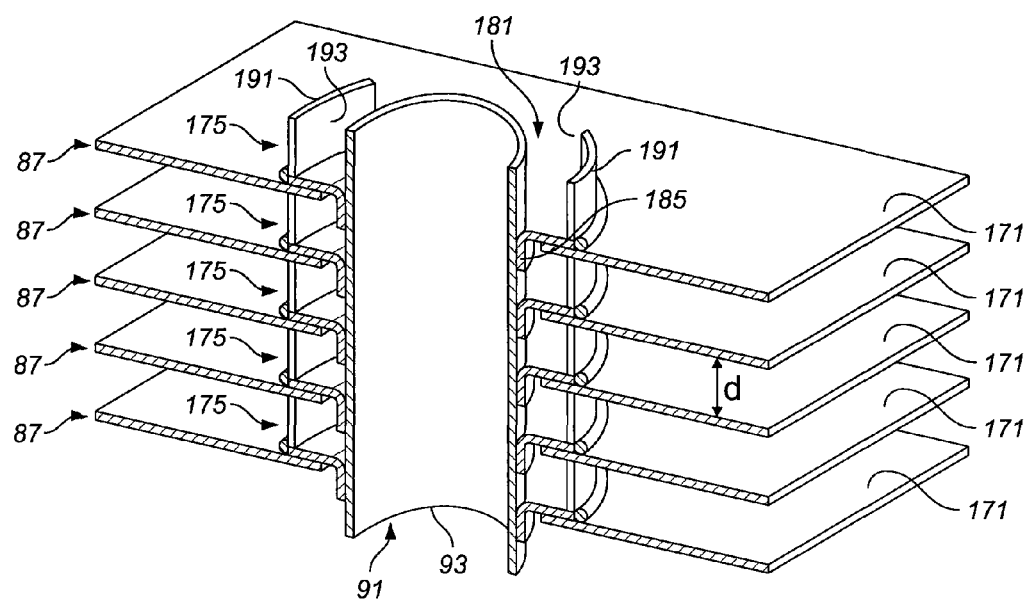
Figure 16:
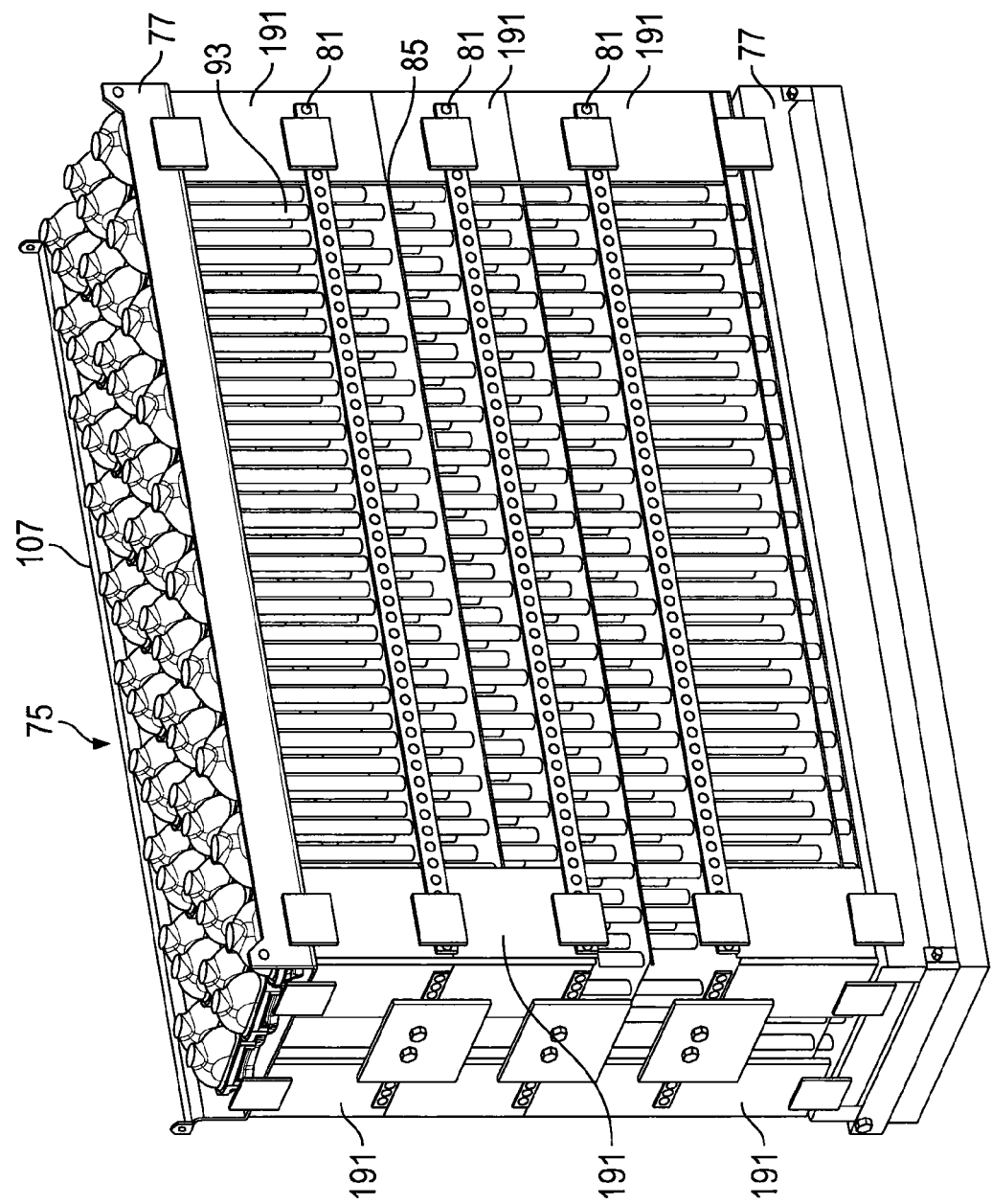
Figure 17A:
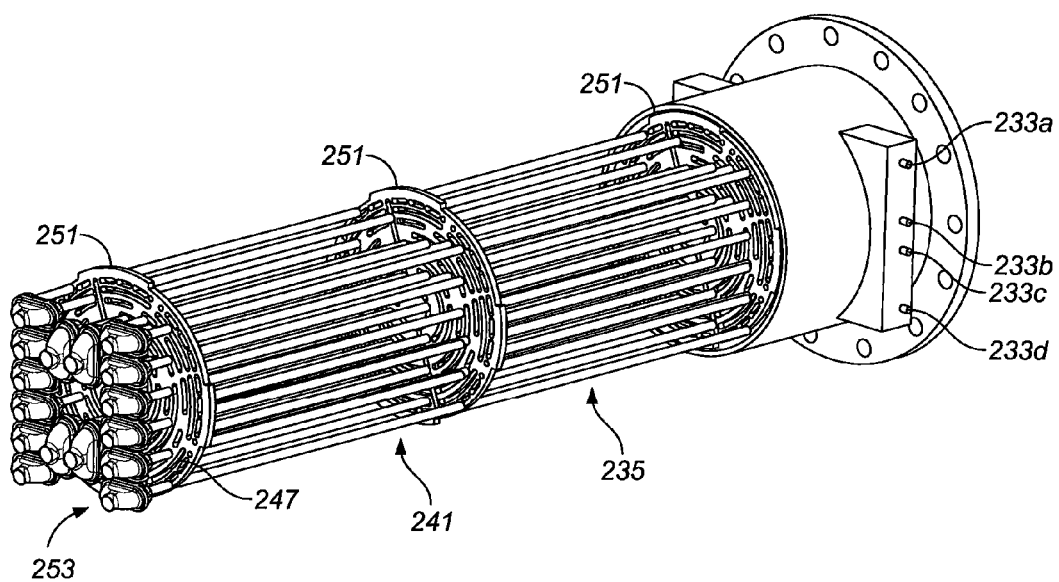
Figure 17B:
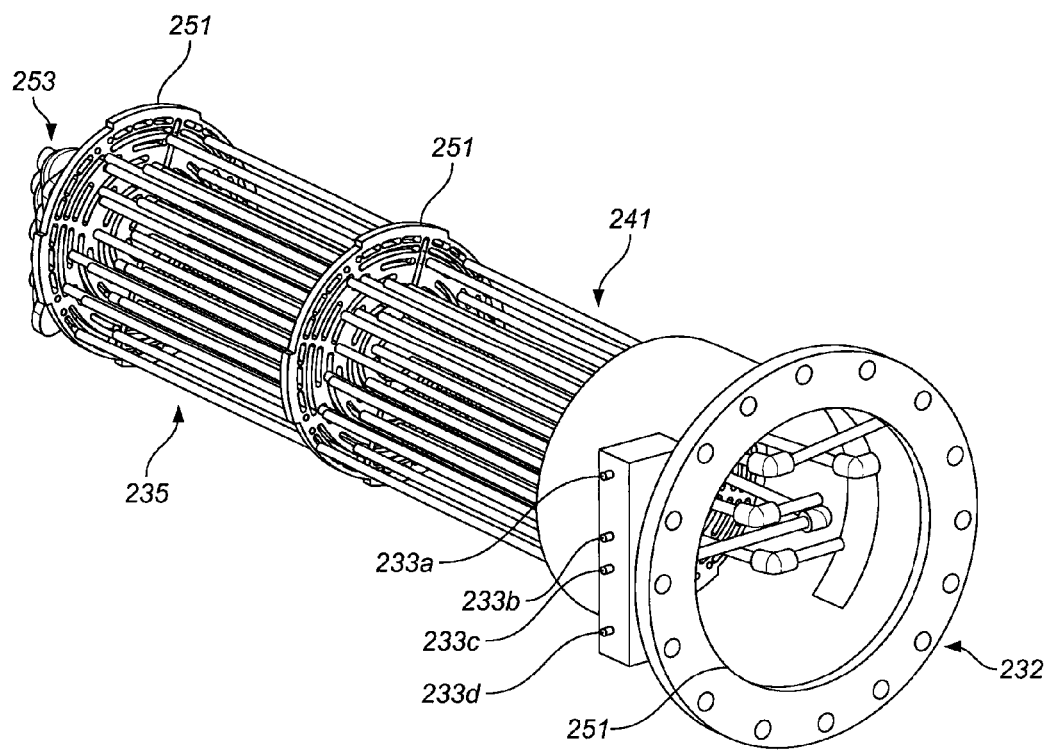
Figure 17C:
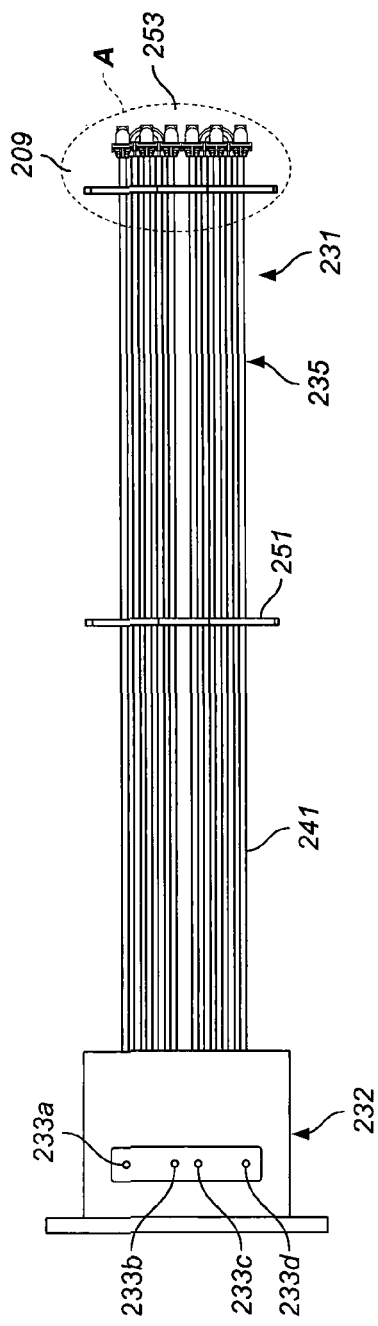
Figure 17D:
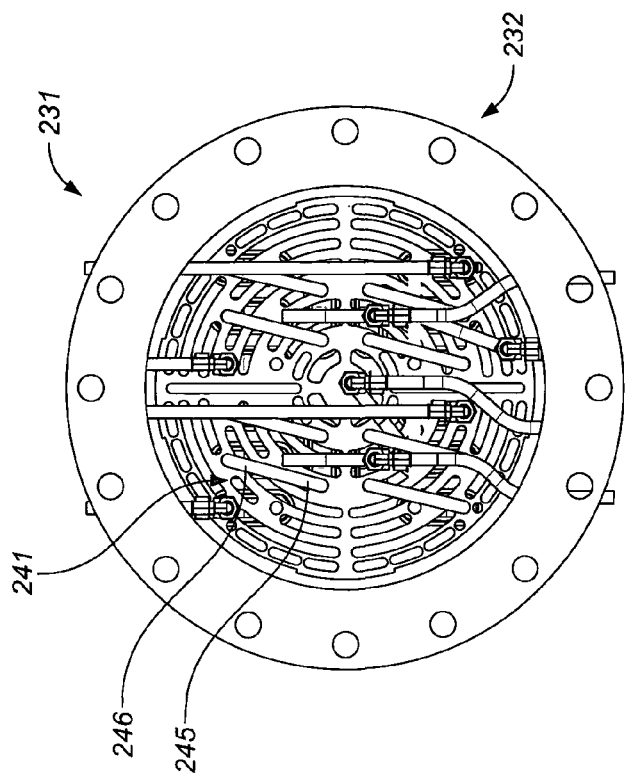

FIGS. 8(a) to (i) illustrate views of the steam generation module of the steam generator of the power generation system of FIG. 1;

FIGS. 9(a) to (f) illustrate views of one heat exchanger unit of the steam generation module of FIG. 8;

FIGS. 10(a) to (c) illustrate one U-shaped tube section of the heat exchanger unit of FIG. 9;

FIGS. 11(a) to (d) illustrate one tube end coupling of the heat exchanger unit of FIG. 9;

FIGS. 12(a) and (b) illustrate a test tool in accordance with one embodiment of the present invention;

FIGS. 13(a) and (b) illustrate a perspective view of the sheet element of one fin of the heat exchanger unit of FIG. 9;

FIGS. 14(a) to (d) illustrate views of one fin coupling element of the heat exchanger unit of FIG. 9;

FIG. 15 illustrates a fragmentary, part cut-away perspective view of a plurality of stacked fins of the heat exchanger unit of FIG. 9 at the junction with one tube element;

FIG. 16 illustrates a perspective view of the heat exchanger unit of FIG. 9, as assembled, with formers interposed between the support elements to support the heat exchanger unit during the forming or brazing operation; and FIGS. 17(a) to (g) illustrate views of the economizer unit of the steam generation generator of the power generation system of FIG. 1.

The power generation system comprises a steam generation unit 1 for generating a superheated fluid, in this embodiment superheated steam, from a working fluid, in this embodiment pure, de-mineralised water, at least one, in this embodiment a plurality of steam engines 3a-d which receive the superheated steam from the steam generation unit 1, and at least one, in this embodiment a plurality of power generators 5a-d which are driven by the respective steam engines 3a-d to generate power, in this embodiment electricity, which can be supplied to the electrical grid.

The steam generation unit 1 comprises a steam generator 11 which receives a stream of heated gas, typically an exhaust gas from a combustion engine, and generates a superheated fluid, in this embodiment superheated steam.

In this embodiment the stream of heated gas has a temperature of from about 425° C. to about 650° C.

In this embodiment the combustion engine is a landfill anaerobic digestion engine or a diesel engine, typically having a power output in the range of from about 0.2 MW to about 3.2 MW.

The steam generation unit 1 further comprises a buffer tank 15 for storing a supply of the working fluid, in this embodiment water, and a pump unit 17 for delivering the water from the buffer tank 15 to the steam generator 11 at a required flow rate and/or pressure.

The steam generation unit 1 further comprises a condenser 21 which receives used steam from the at least one steam engine 3a-d, condenses the used steam to a saturated liquid, in this embodiment water, and delivers the same to the buffer tank 15.

With this configuration, the steam generator 11, the at least one steam engine 3a-d, the condenser 21 and the buffer tank 15 define a circulatory loop through which the working fluid is circulated, in being converted from a saturated liquid, here water, to a superheated fluid, here superheated steam, and back to a saturated liquid.

Figure 2A:
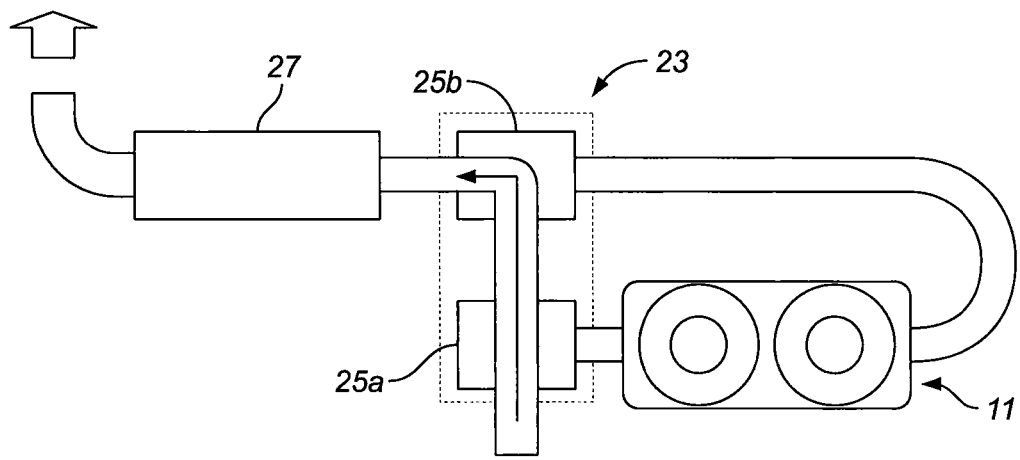
Figure 2B:
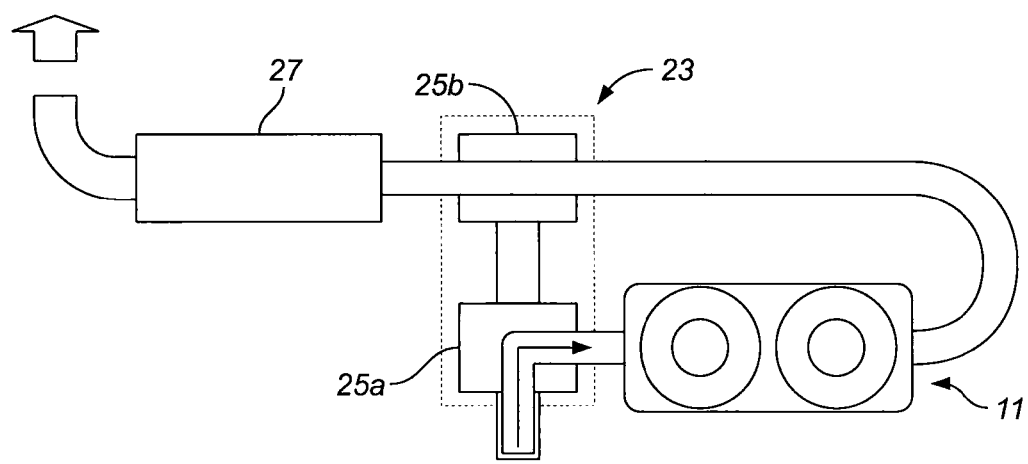
Figure 3:
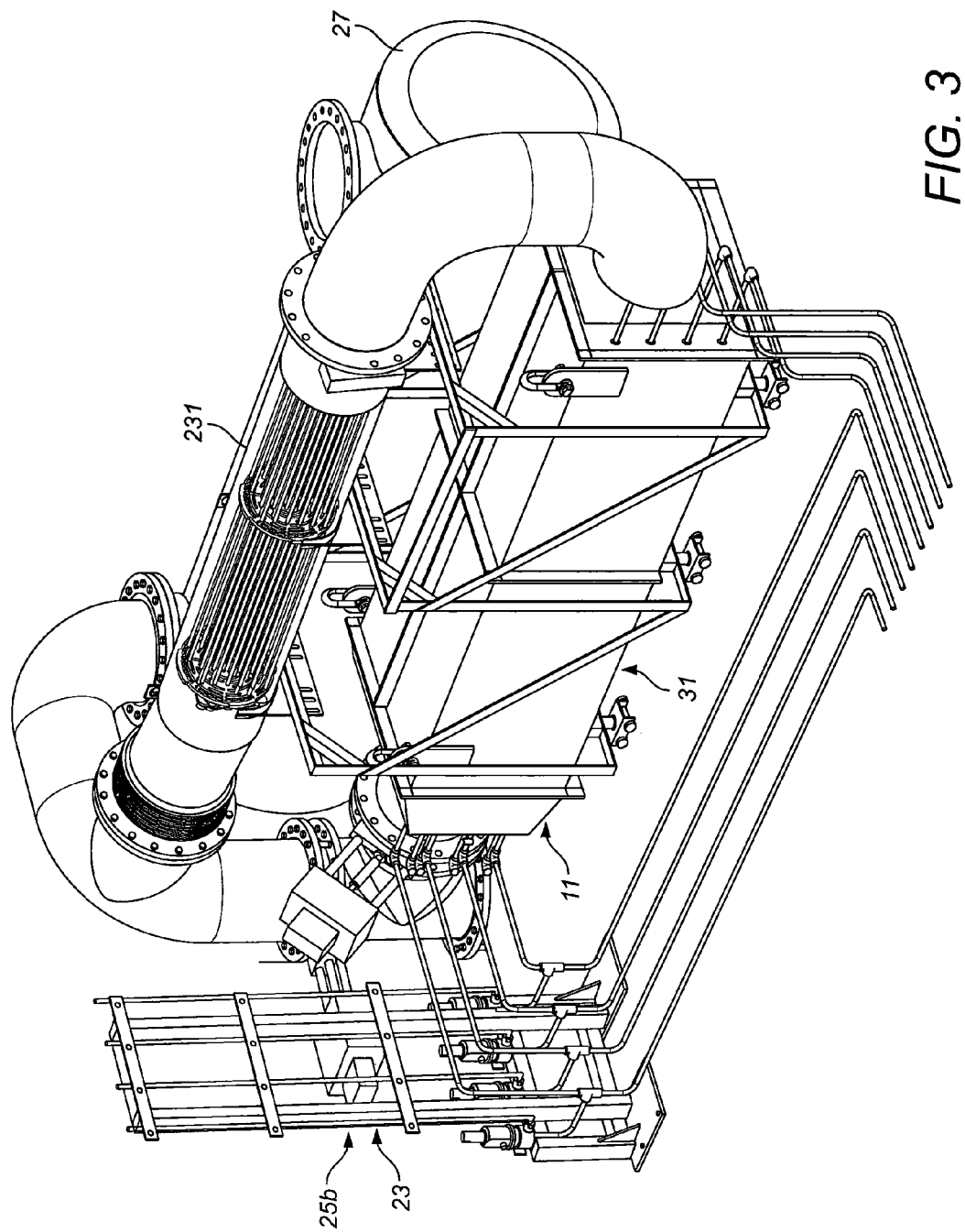
FIG. 3 illustrates the steam generator of the power generation system of FIG. 1.
Figure 4:
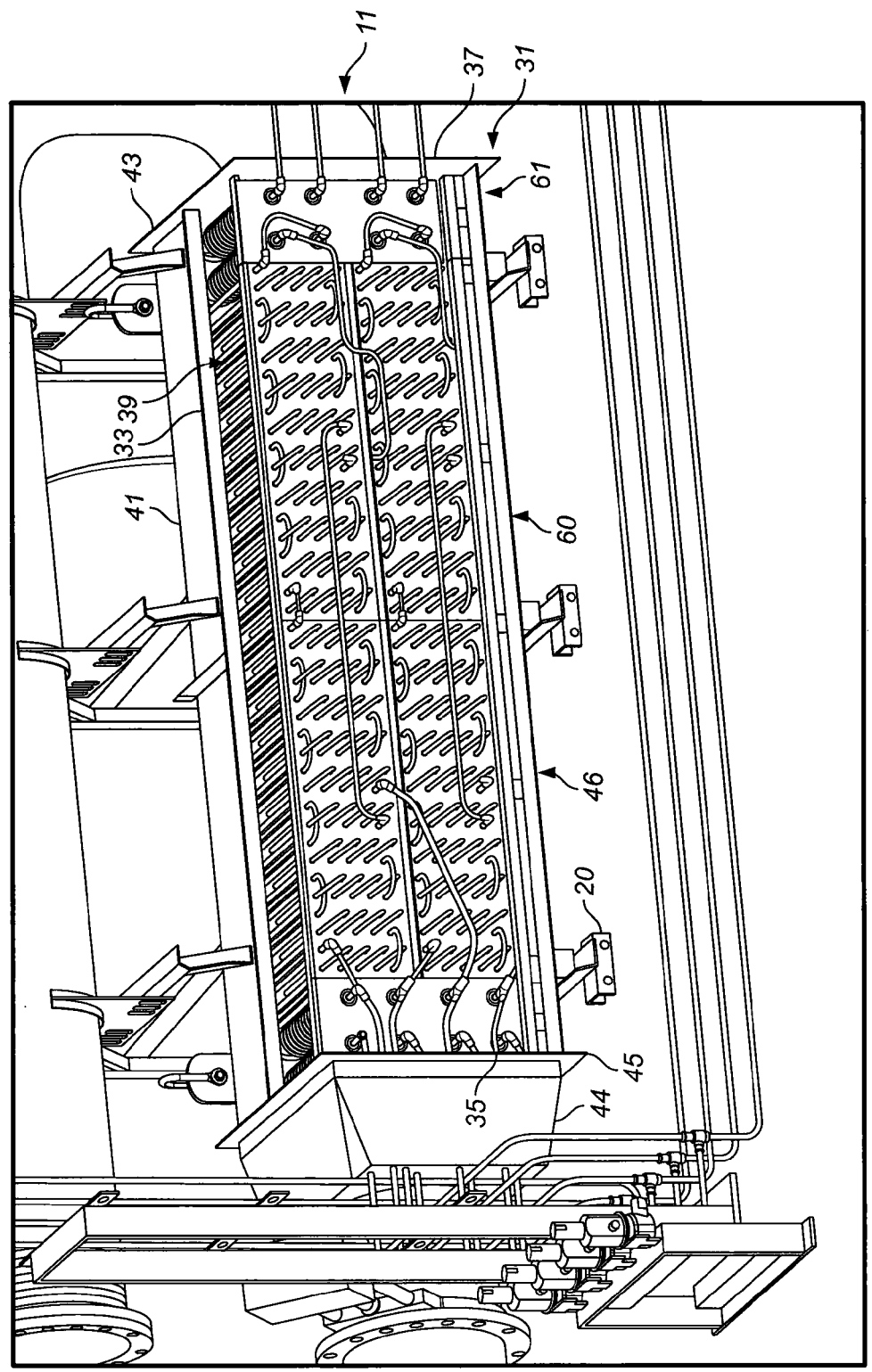
FIGS. 4 and 5 illustrate part cut-away perspective views of the steam generator of the power generation system of FIG. 1.

In this embodiment the steam generation unit 11 further comprises a by-pass unit 23, here comprising first and second valves 25a, b, which can be selectively operated between a first, by-pass mode, as illustrated in FIG. 2(a), in which the exhaust gas by-passes the steam generation unit 11 and passes directly through a muffler 27, and a second, operative mode, as illustrated in FIG. 2(b), in which the exhaust gas is delivered through the steam generation unit 11 prior to the muffler 27. In one embodiment the by-pass unit 23 could be configured to provide that a portion of the heated gas is delivered through the steam generation unit 11, in dependence upon the heat requirements of the steam generation unit 11, with the remainder of the exhaust gas by-passing the steam generation unit 11.

The steam generator 11 comprises a housing 31, which defines a gas flow path 33 and has an inlet 35 at one, upstream end thereof into which a stream of heated gas is delivered and an outlet 37 at the other, downstream end thereof through which the stream of heated gas exits, and a steam generation module 39 which disposed within the gas flow path 33 of the housing 31.

In this embodiment the housing 31 comprises a main housing part 41 which defines the gas flow path 33 therewithin, and first and second end housing parts 43, 44 which are attached to the respective ends of the main housing part 41.

In this embodiment the housing 31 is formed of stainless steel, here having a thickness of 4 mm.

In this embodiment the main housing part 41 has a rectangular internal cross-section.

In this embodiment one of the end housing parts 43 is fixed, here by welding, to the main housing part 41, and the other of the end housing parts 44 is removable from the main housing part 41, in this embodiment by a flange coupling 45, here a bolted flange coupling.

In this embodiment the removable end housing part 44 is at the upstream end of the housing 31, and removal of that end housing part 44 allows for the steam generation module 39 to be loaded into or unloaded from the housing 31.

In this embodiment the main housing part 41 provides a flow path F therethrough.

In one embodiment the main housing part 41 could be configured to provide first and second ancillary flow paths to the respective outer, lateral sides of the steam generation module 39. In one embodiment the ancillary flow paths receive less than 10%, preferably less than 5% of the gas flow through the housing 31.

In this embodiment the housing 31 includes a support 46 for supporting the steam generation module 39, which is disposed within the main housing part 41 and allows for the steam generation module 39 to be slideably introduced into or withdrawn from the main housing part 41 on removal of the removable end housing part 44.

In this embodiment the support 46 comprises rails 47, here first and second rails 47 at the respective outer edges thereof, along which the steam generation module 39 is slideable.

Figure 5:
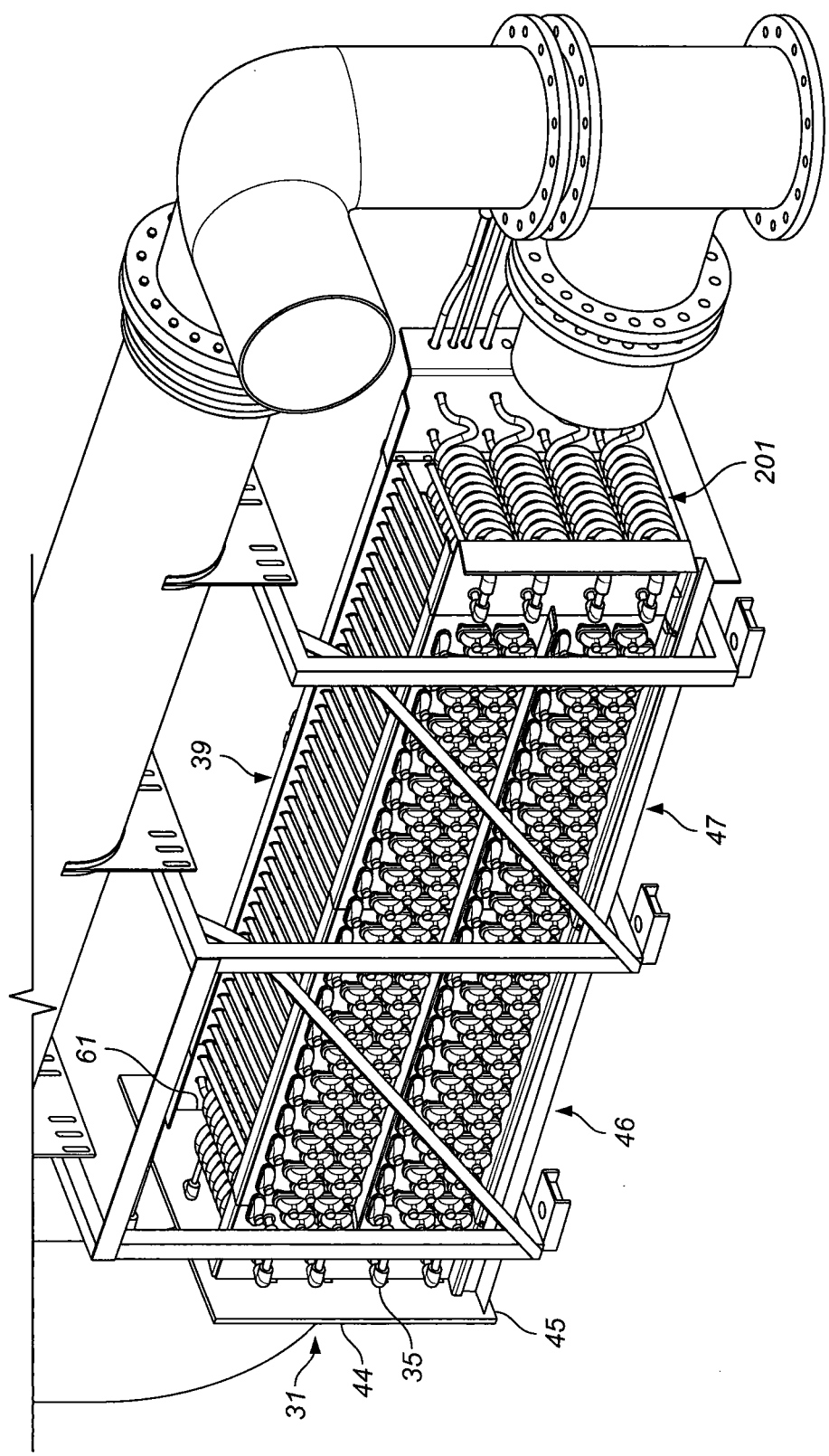
Figure 6:
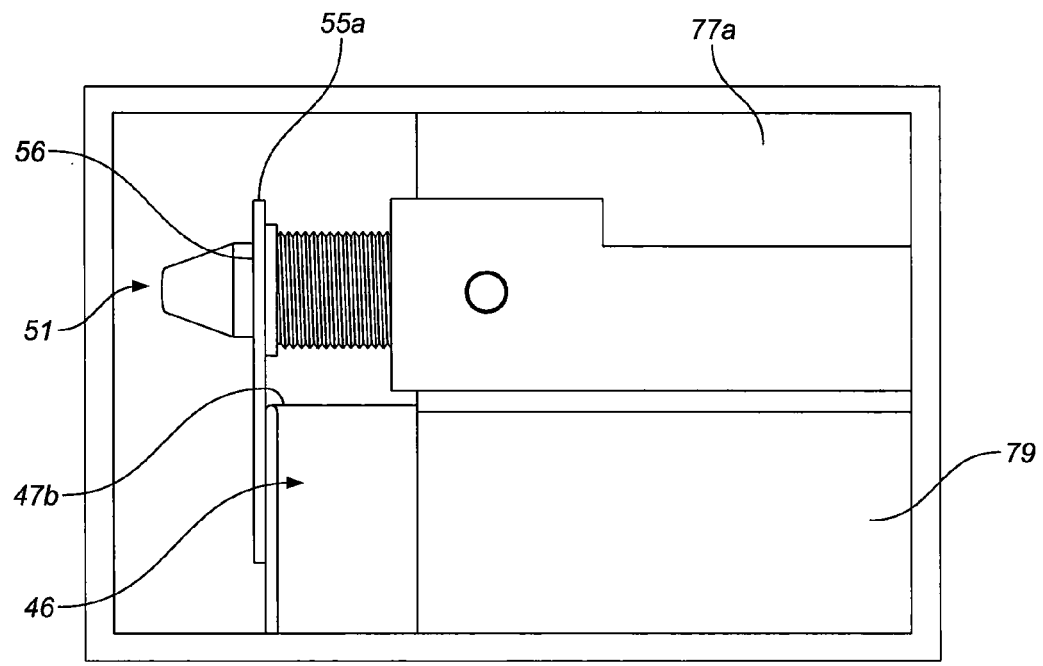
FIG. 6 illustrates the locating fixture of the steam generation module of the steam generator of the power generation system of FIG. 1.
Figure 7:
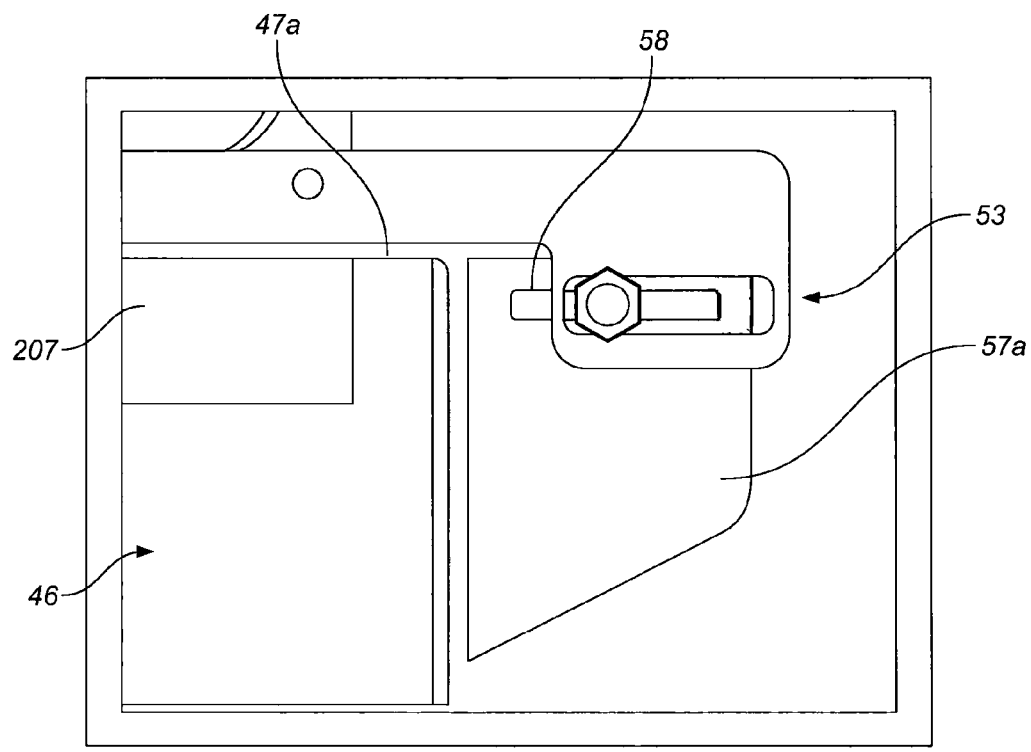
FIG. 7 illustrates the locking fixture of the steam generation module of the steam generator of the power generation system of FIG. 1.
Figure 8A:
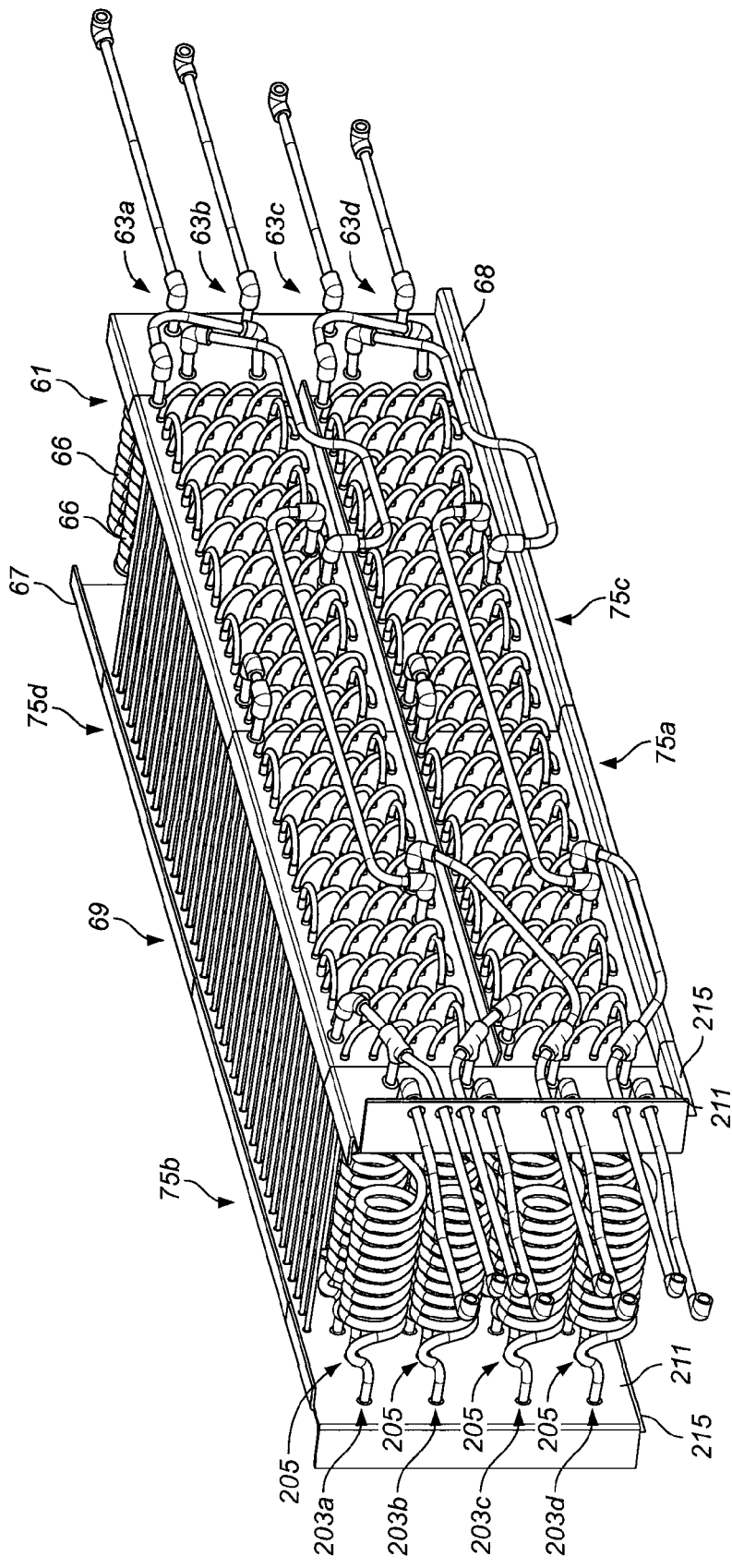
Figure 8B:
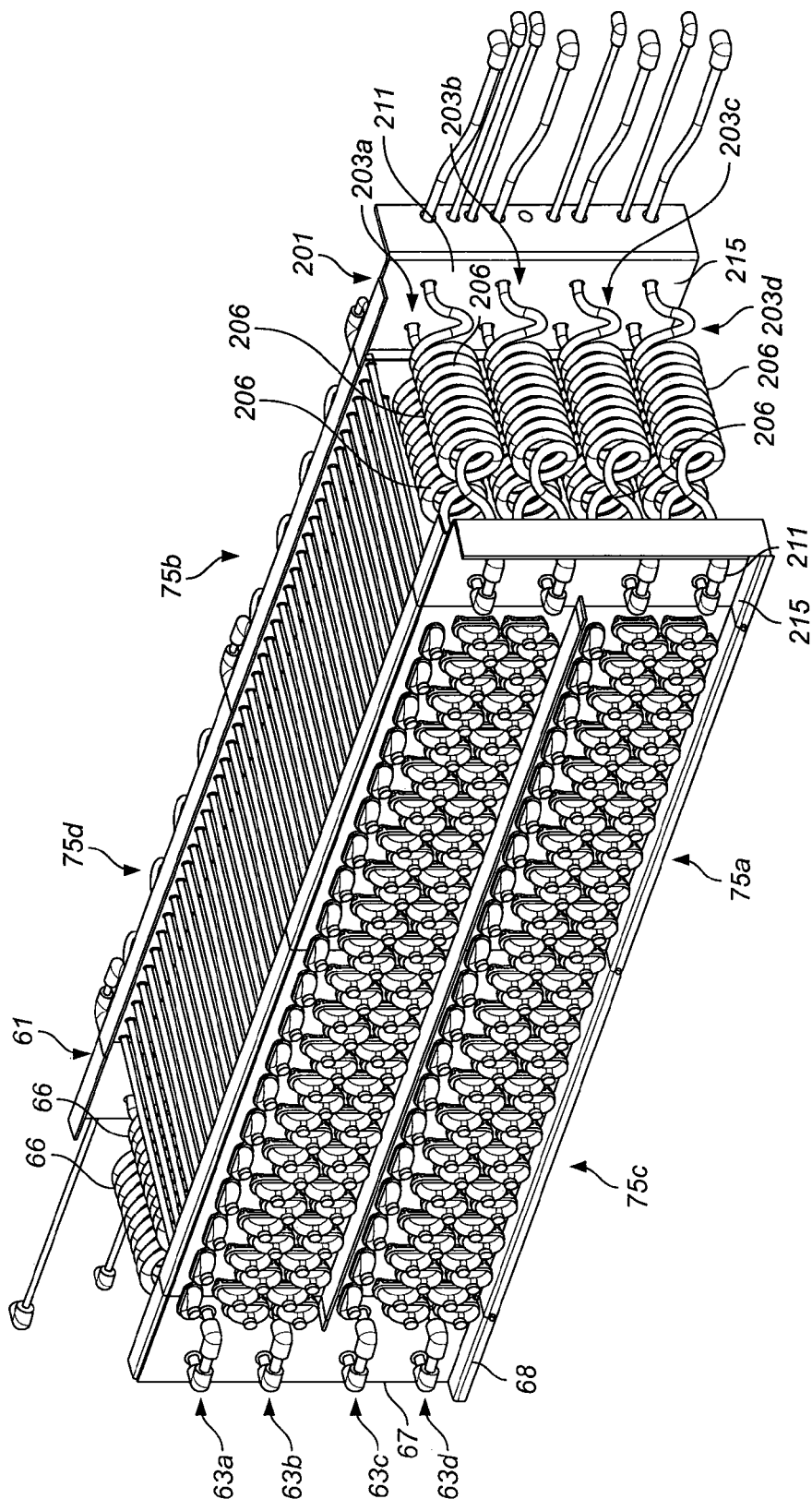
Figure 9A:
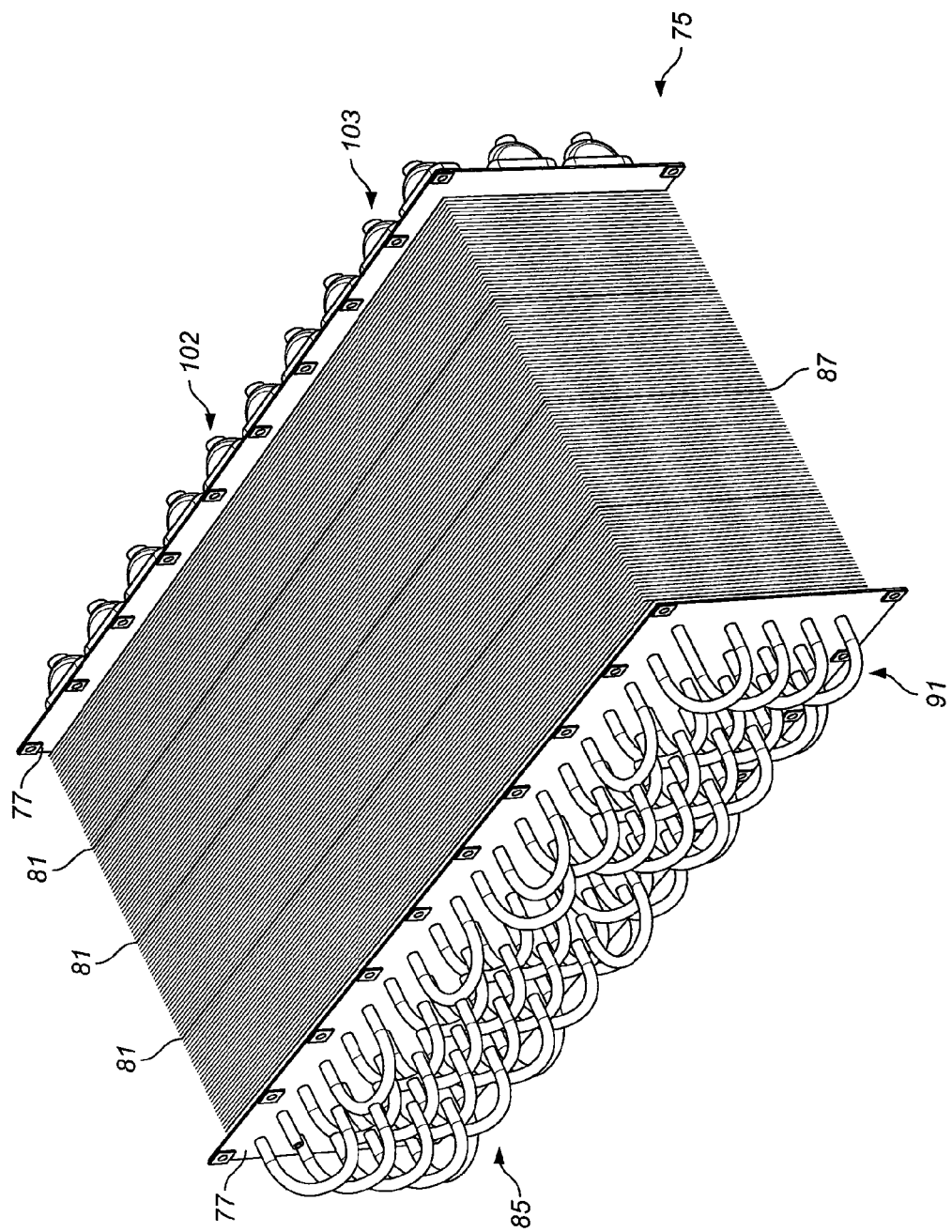
Figure 9B:
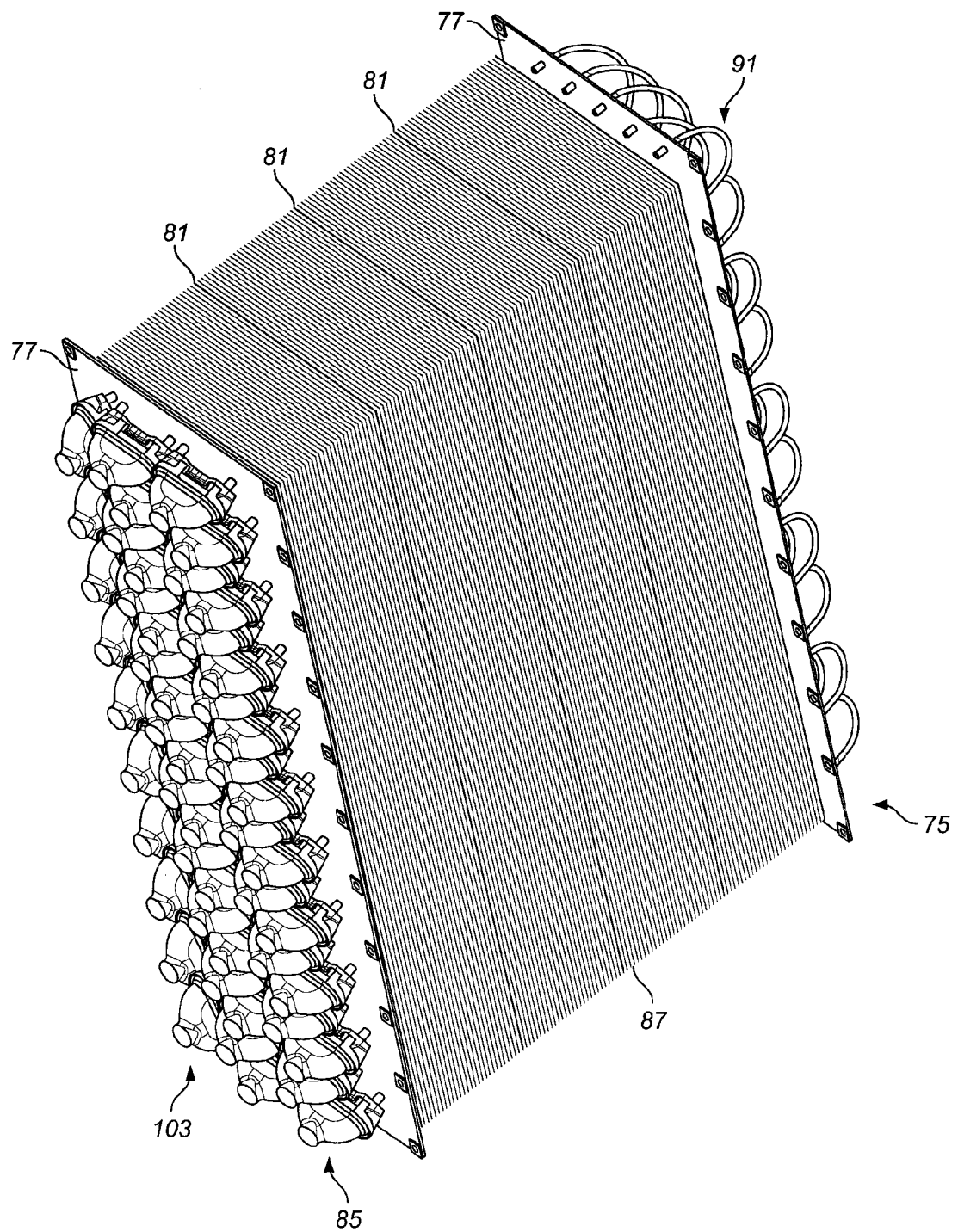
Figure 9E:
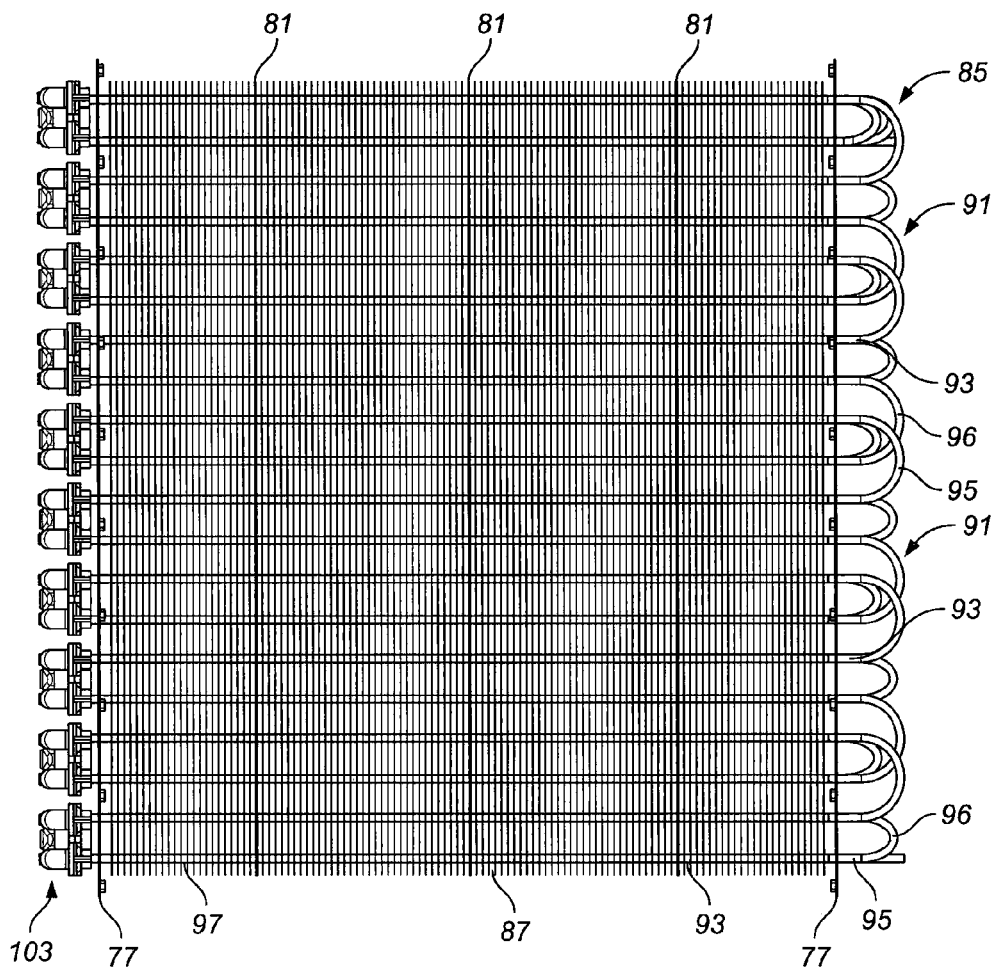
Figure 9F:
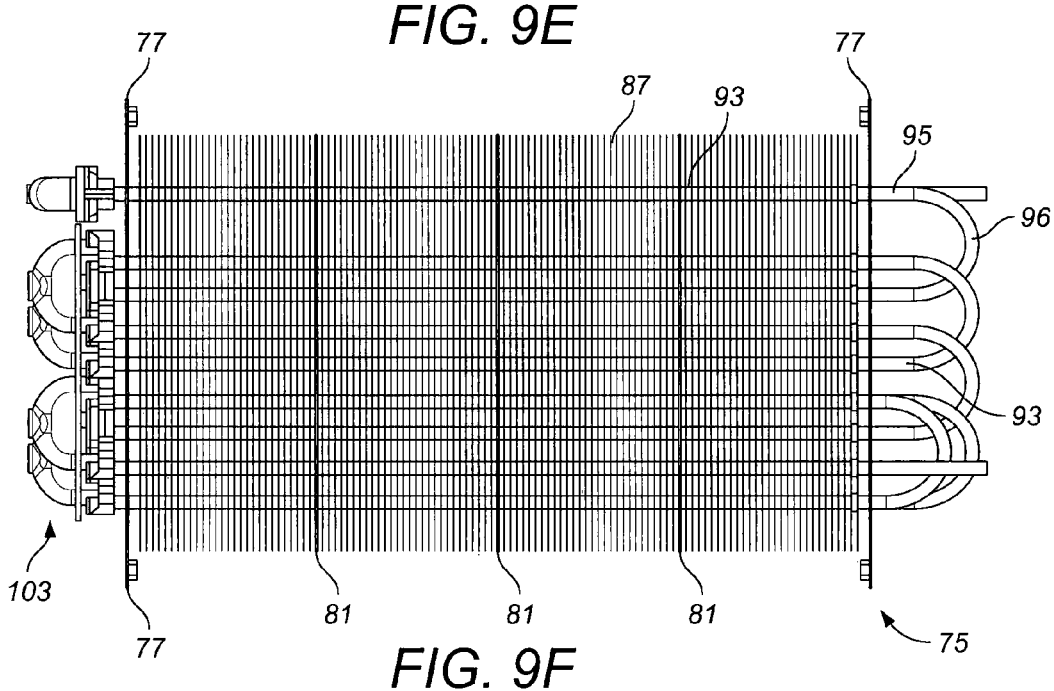
Figure 11A:
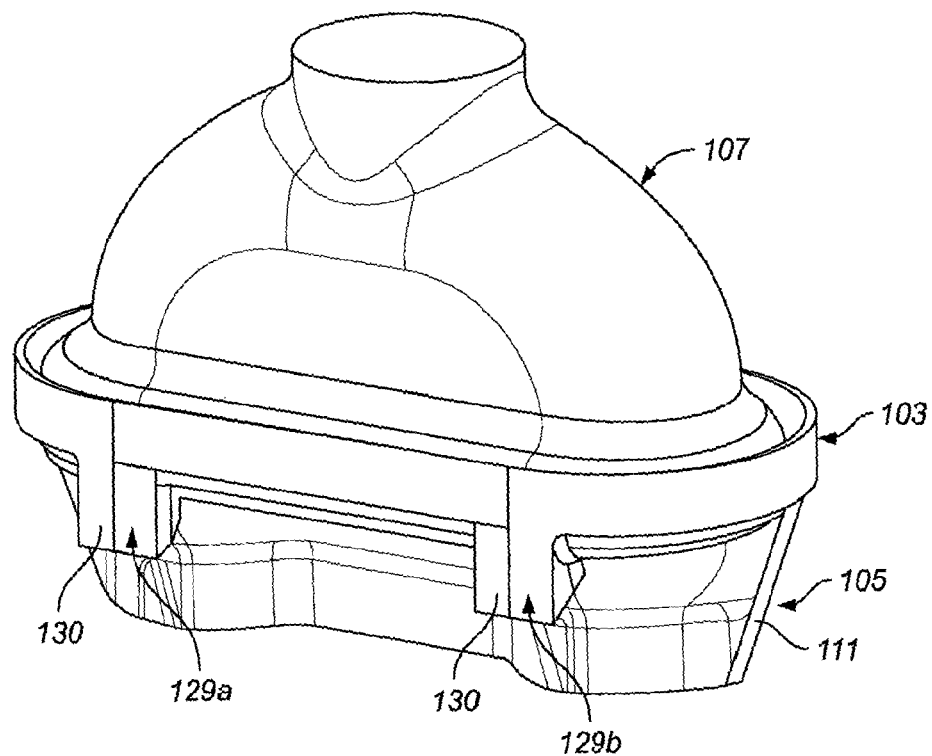
Figure 11B:
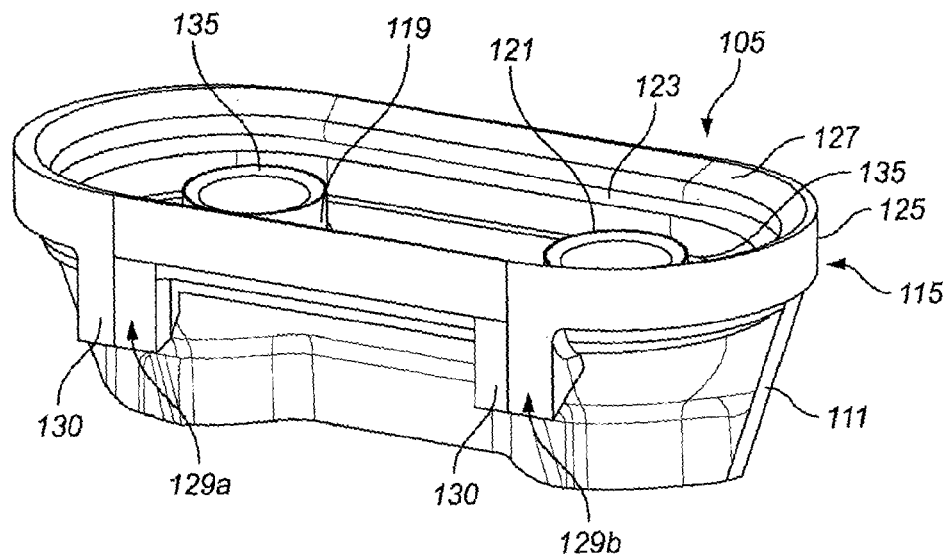
Figure 11C:
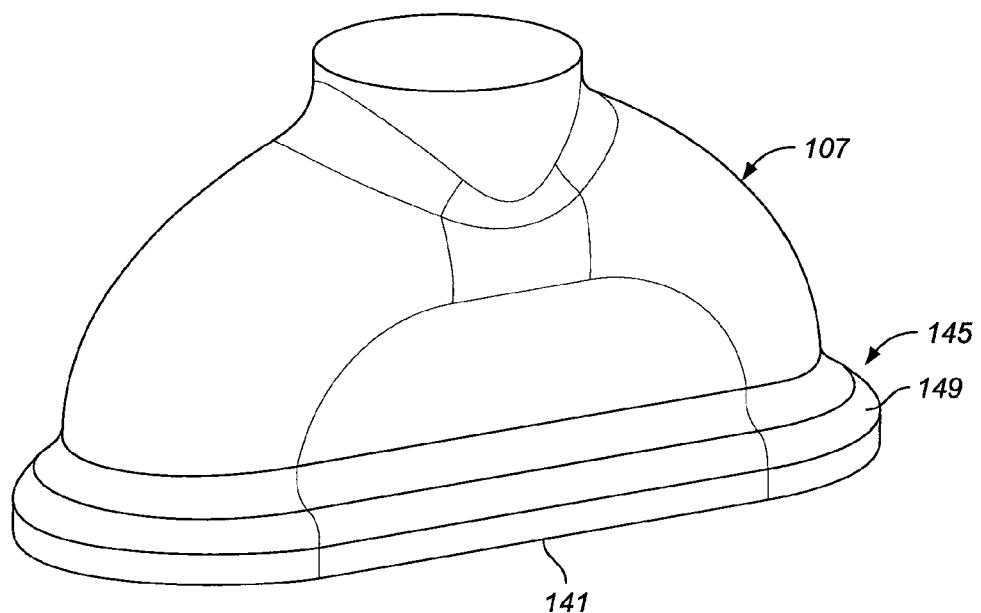
Figure 11D:
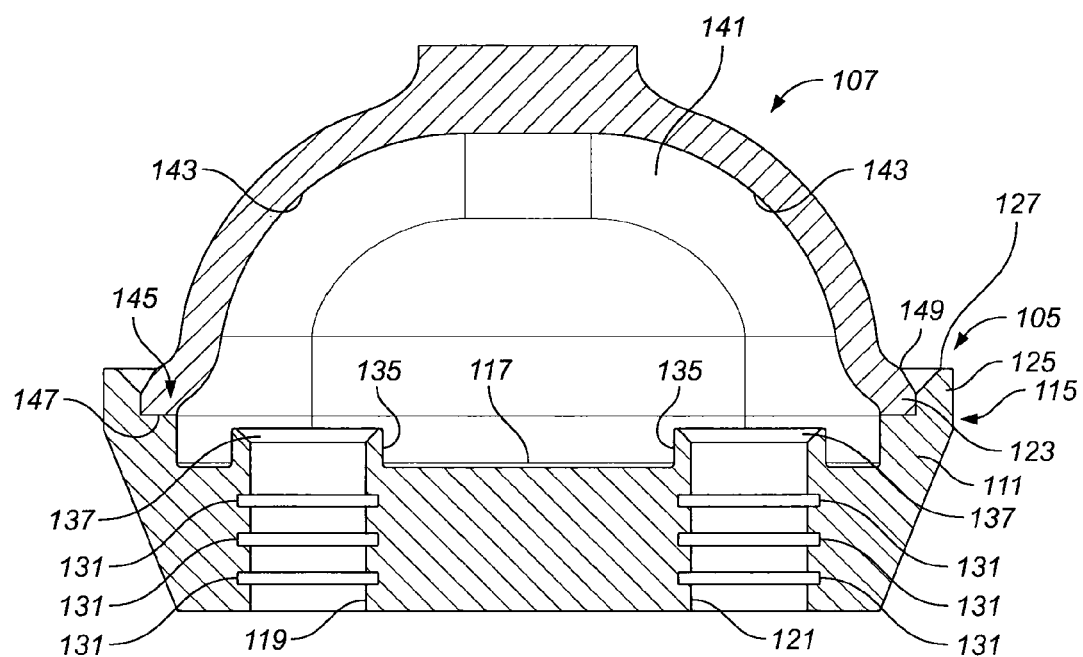

In one embodiment, as illustrated in FIGS. 5 and 6, the support 46 includes a locator fixture 51, here disposed at one, downstream end of the support 46, for locating one, downstream end of the steam generation module 39, and a locking fixture 53, here disposed at the other, upstream end of the support 46, for locking the steam generation module 39 to the support 46 in a manner which allows for expansion of the steam generation module 39.

In this embodiment the locator fixture 51 comprises first and second locating elements 55, here including locating apertures 56, which are disposed at the downstream ends of the rails 47.

In this embodiment the locking fixture 53 comprises first and second locking elements 57, here including locking apertures 58, which are disposed at the upstream ends of the rails 47.

The steam generation module 39 comprises a pre-heater unit 61 which is operative to raise the temperature of a received working fluid, here water, as a saturated liquid, typically having a temperature of about 70° C., to a temperature of from about 100° C. to about 120° C., and optionally to a temperature of from about 100° C. to about 110° C.

The pre-heater unit 61 comprises at least one pre-heater circuit 63, in this embodiment a plurality of pre-heater circuits 63a-d, which each comprise pre-heater pipework 65 and each has an input fluidly connected to the buffer tank 15 and an output from which the working fluid of raised temperature is delivered.

In this embodiment the pre-heater pipework 65 comprises at least one, here a plurality of coils 66, which accommodate longitudinal and lateral expansion.

In this embodiment the pre-heater coils 66 comprise a coil element, here a helically-wound coil, having an inlet and an outlet, which are located on the longitudinal axis thereof. In this embodiment the coil element is wound about the longitudinal axis.

With this symmetric configuration, the spring force caused by expansion of the coil 66 is uniform.

In this embodiment the coils 66 comprise slip couplings, here in the form of sleeves, which shroud the inlet and the outlet of the coil element, such as to protect the coil element from frictional engagement with support elements.

In this embodiment the pre-heater unit 61 comprises first and second support elements 67 which support the pre-heater pipework 65 of the pre-heater circuits 63a-d and are disposed in spaced relation and define a width of the pre-heater unit 61.

In this embodiment the support elements 67 each include a rail guide 68 at the lower edge thereof, which overlies a respective one of the rails 47 of the support 46 of the housing 31, such as to provide for sliding engagement with the rails 47.

In this embodiment the support elements 67 of the pre-heater unit 61 are formed from stainless steel sheet, here having a thickness of 6 mm.

In this embodiment the pre-heater pipework 65 is formed of stainless steel tube, here having an external diameter of 12.7 mm and a 16 swg wall thickness.

The steam generation module 11 further comprises a heat exchanger unit 69 which is located in series upstream of the pre-heater unit 61, and is operative to raise the temperature of the working fluid as received from the pre-heater unit 61, in this embodiment to a temperature of about 260° C., thereby providing the working fluid as saturated steam.

The heat exchanger unit 69 comprises at least one heat exchanger circuit 73, in this embodiment a plurality of heat exchanger circuits 73a-d, which each have an input fluidly connected to a respective one of the pre-heater circuits 63a-d of the pre-heater unit 61 and an output from which the working fluid, as saturated steam, is delivered.

The-heat exchanger unit 69 comprises at least one heat exchanger module 75, in this embodiment a plurality of heat exchanger modules 75a-d, which together provide the heat exchanger circuits 73a-d.

In this embodiment the heat exchanger modules 75a-d define an n×m array, here a 2×2 array.

In this embodiment the heat exchanger modules 75a-d each provide part of the flow path of a plurality of the heat exchanger circuits 73a-d, here of two heat exchanger circuits 73a-d, with the first heat exchanger circuit 73a being provided by the fourth heat exchanger module 75d and the second heat exchanger module 75b in series, the second heat exchanger circuit 73b being provided by the fourth heat exchanger module 75d and the second heat exchanger module 75b in series, the third heat exchanger circuit 73c being provided by the third heat exchanger module 75c and the first heat exchanger module 75a in series. With this arrangement, loading balancing is achieved with increasing mass flow rates of the heated gas stream.

In this embodiment the heat exchanger circuits 73a-d each have a power output of at least 60 kW, optionally at least 80 kW, and together provide a total power output at least 180 kW, optionally at least 240 kW.

In this embodiment the heat exchanger modules 75a-d each comprise first and second outer support elements 77 which are disposed in spaced relation and define a width of the heat exchanger unit 69.

In this embodiment the outer support elements 77 of the heat exchanger modules 75a-d are formed from stainless steel sheet, here having a thickness of 6 mm.

In this embodiment the outer support elements 77 of the heat exchanger modules 75a-d are interconnected by sliding couplings, which allow relative movement of the heat exchanger modules 75a-d, thus accommodating relative expansion thereof.

In this embodiment the outer support elements 77 of one, the lowermost, of the heat exchanger modules 75a-d each include a rail guide 79 at the lower edge thereof, which overlies a respective one of the rails 47 of the support 46 of the housing 31, such as to provide for sliding engagement with the rails 47.

In this embodiment the heat exchanger modules 75a-d each comprise a plurality of inner support elements 81 which are disposed in spaced relation between the outer support elements 77.

In this embodiment the inner support elements 81 of the heat exchanger modules 75a-d are formed from stainless steel sheet, here having a thickness of 6 mm.

In this embodiment the heat exchanger modules 75a-d each comprise heat exchanger pipework 85 which extends between the outer support elements 77 of the heat exchanger modules 75a-d, and a plurality of fins 87 which extend in spaced, parallel relation to the outer support elements 77 of the heat exchanger modules 75a-d. For purposes of illustration, only some of the fins 87 are illustrated in certain of the views.

In this embodiment the heat exchanger pipework 85 comprises a plurality of bent, U-shaped tube sections 91, which each provide two spaced, parallel elongate tube elements 93, one ends 95 of which are continuously fluidly connected by a 180 degree radiused bend 96, and the other ends 97 of which are open and in spaced relation.

In this embodiment, as illustrated in FIG. 8(c), the tube sections 91 comprise first tube sections 91a, which are arranged as a plurality of lines 92a-j, such that the flow of the working fluid is along the lines 92a-j in series, and second, cross-over tube sections 91b, which provide for a cross-over transfer flow between the respective lines 92a-j. In this embodiment, as described hereinabove, the heat exchanger units 75a-d each provide part of the flow paths of a plurality of heat exchanger circuits 73a-d. In this embodiment the lines 92a-e and lines 92-f-j provide separate flow paths, being parts of different heat exchanger circuits 73a-d.

In this embodiment the tube elements 93 of the first tube sections 91a have a closer spacing than the tube elements 93 of the second tube sections 91b.

In this embodiment the lines 92a-j are arranged as vertical lines in spaced relation along a length of the heat exchanger unit 69, such that the flow is through each row 92a-j, here vertically upwards or downwards, with the flow passing laterally across the heat exchanger unit 69 in alternate directions.

In this embodiment the other, open ends 97 of the tube sections 91 extend to a generally common plane, and the open ends 97 of the tube elements 93 of adjacent tube sections 91 have a common spacing, which allows for fluid connection of the open ends 97 by a single size of tube end coupling 103, as will be described in more detail hereinbelow.

In this embodiment the tube sections 91 are formed of stainless steel tube, here having an external diameter of 12.7 mm and a 16 swg wall thickness.

In this embodiment the open ends 97 of the tube elements 93 each include an outwardly-inclined internal chamfer 101, here of 45 degrees.

In this embodiment the heat exchanger pipework 85 further comprises a plurality of tube end couplings 103 which fluidly connect the open end 97 of one tube element 93 from each of two adjacent tube sections 91.

With this configuration, the tube sections 91 and the pipe end couplings 103 provide continuous flow paths which extend in alternate directions across a width of the heat exchanger module 75a-d, and thus the gas flow passage 33 of the housing 31.

In this embodiment the pipe end couplings 103 each comprise a main body part 105 to which the open ends 97 of the adjacent tube sections 91 are fixed, and an enclosure part 107 which is fixed to the main body part 105 and provides a closed fluid connection between the respective open ends 97 of the adjacent tube sections 91.

In this embodiment the main body part 105 comprises a body 111, which includes a flange 115 which encloses a surface 117, and first and second bores 119, 121 which extend to the surface 117, such as to provide fluid communication thereto.

In this embodiment the flange 115 defines an annular seat 123 to which the enclosure part 107 is fixed, and an upstand 125 which extends around the seat 123 and includes an inwardly-inclined internal chamfer 127, here of about 45 degrees.

As will be described in more detail hereinbelow, this configuration allows the enclosure part 107 to be located on the seat 123, and the enclosure part 107 to be fixed to the main body part 105, in this embodiment by providing an annular weld at the junction of the internal chamfer 127.

In this embodiment the main body part 105 includes at least one clamping fixture 129 for engagement by a testing tool 151, as will be described in more detail hereinbelow, here first and second clamping fixtures 129a, b, which are each configured to engage a clamping fixture 164 on the testing tool 151.

In this embodiment the clamping fixtures 129a, b each comprise first and second pairs of detents 130, here lugs, which are disposed to opposite sides of the respective through bores 119, 121.

In this embodiment the through bores 119, 121 each include at least one, here a plurality of grooves 131, into which the open end 97 of a respective one of the tube elements 93 of the adjacent tube sections 91 is expanded, here by swaging.

In this embodiment the through bores 119, 121 each terminate at an upstand 135 which projects from the surface 117 and to which the open end 97 of a respective one of the tube elements 93 of the adjacent tube sections 91 is fixed, here by an annular weld 136.

In this embodiment the upstand 135 includes an inwardly-inclined internal chamfer 137, here of 45 degrees, which, together with the outwardly-inclined external chamfer 101 on the open end 97 of the respective tube element 93, defines a channel for receiving the weld.

In this embodiment the enclosure part 107 includes an internal cavity 141 which defines an arcuate surface having first and second bend radii 143, which are disposed opposite the through bores 119, 121 in the main body part 105, thereby defining a 180 degree radiused bend between the through bores 119, 121.

In this embodiment the enclosure part 107 includes a flange 145 which extends around the internal cavity 141.

In this embodiment the flange 145 defines an annular seat 147 which corresponds to the annular seat 123 as defined by the flange 115 of the main body part 105, and includes an outwardly-inclined external chamfer 149, here of about 45 degrees.

With this configuration, the enclosure part 107 can be fixed to the main body part 105 by providing an annular weld at the junction of the internal chamfer 127 of the main body part 105 and the external chamfer 149 of the enclosure part 107.

In this embodiment the main body part 105 and the enclosure part 107 are formed of stainless steel.

In this embodiment the main body part 105 and the enclosure part 107 are fabricated by casting, here investment casting, but other fabrication methods could be employed.

FIGS. 12(a) and (b) illustrate a testing tool 151 in accordance with one embodiment of the present invention for pressure testing the fixing of the tube elements 93 to the through bores 119, 121 of the main body parts 105 of the tube end couplings 103.

The testing tool 151 comprises a test body 153, which includes a chamber 155, which, when the testing tool 151 is fitted to the main body part 105 of one tube end coupling 103, is fluidly connected to one through bore 119, 121 of the main body part 105 under test.

In this embodiment the test body 153 includes a first, coupling port 156, here a circular aperture, and a sealing element 157, here an annular seal, which surrounds the coupling port 156, such as to provide for sealing engagement between the chamber 155 and the main body part 105 under test.

In this embodiment the coupling port 156 is shaped and sized to fit over the upstand 135 of one of the through bores 119, 121 of the main body part 105, with the sealing element 157 engaging the surface 117 of the main body part 105. In an alternative embodiment the sealing element 157 could be configured to seal against the outer peripheral surface of the upstand 135.

In this embodiment the test body 153 further includes a pressure connection port 159 which is fluidly connected to the chamber 155 and allows for connection of one or both of a pressure source 160 for delivery of a pressure to the chamber 155 or a pressure detector 161 for detection of a pressure at the chamber 155.

The testing tool 151 further comprises a clamping arrangement 162 for clamping the test body 153 to the main body part 105 under test.

In this embodiment the clamping arrangement 162 comprises a clamp body 163 to which the test body 153 is movably disposed, and a clamping fixture 164 for clamping the clamp body 163, and the test body 153 which is supported thereby, to the main body part 105 under test, here by engagement with one clamping fixture 129a, b on the main body part 105.

In this embodiment the clamping fixture includes a pair of clamping arms 165a, b, which are configured to engage a respective pair of clamping fixtures 129a, b on the main body part 105.

In this embodiment the clamping arms 165a, b are movably disposed to the clamp body 163, here pivotally coupled, and each include a detent 166, here a lug, at one end thereof for engagement with the counterpart detent 130 of the clamping fixture 129a, b of the main body part 105.

In this embodiment the clamping arrangement 162 further comprises a biasing mechanism 167 for biasing the test body 153 relative to the clamp body 163, such as to fix the test body 153 in sealing engagement with the respective through bore 119, 121, here by sealing engagement with the surface 117 of the main body part 105.

In this embodiment the biasing mechanism 167 comprises a drive member 168 which is axially displaceable relative to the clamp body 163, here by a threaded coupling 169 with the clamp body 163, such that rotation of the drive member 168 causes axial displacement of the test body 153. In other embodiments the drive member 168 could be operated by an electrically-operated actuator.

The testing tool 151 further comprises a pressure source 160 which is fluidly connected to the pressure connection 159 of the test body 153, and a pressure detector 161 for providing an indication of the acceptability of the fixing of the tube elements 93 to the through bores 119, 121 of the main body part 105 under test.

With this configuration of the main body part 105 of the tube end coupling 103, and, through use of the testing tool 151, the acceptability of the fixing of each main body part 105 can be assured before completing the tube end coupling 103 by fixing, here welding, the enclosure part 107 to the respective main body part 105.

Figure 13B:
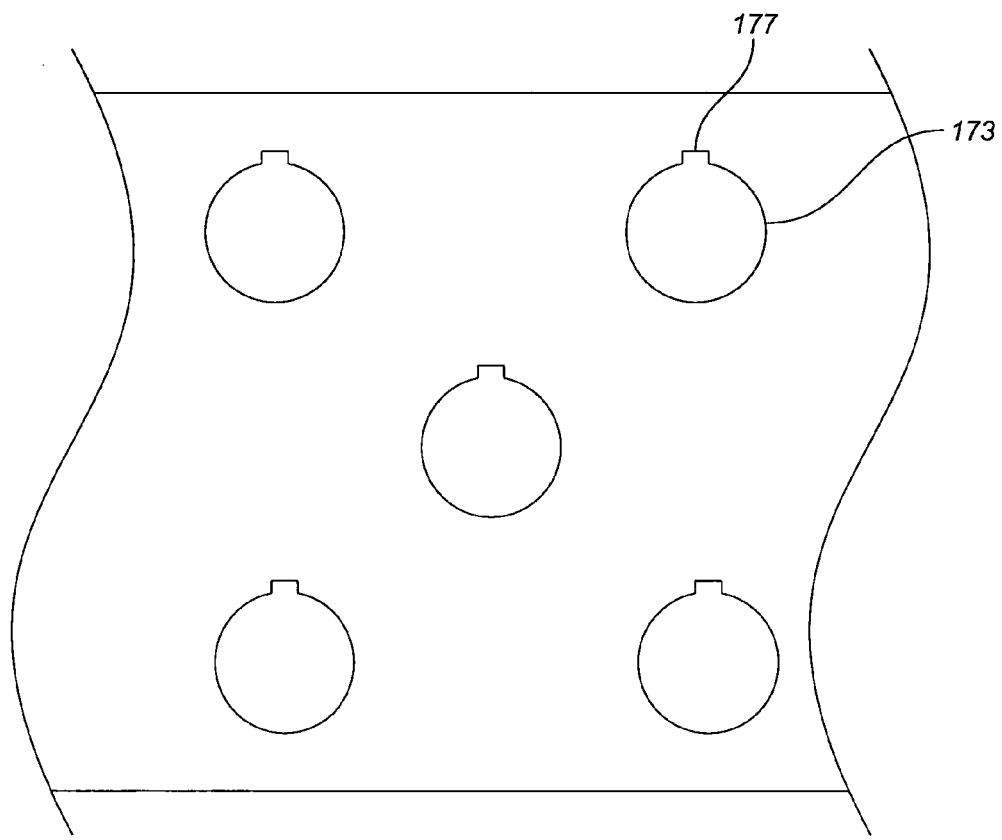
Figure 14A:
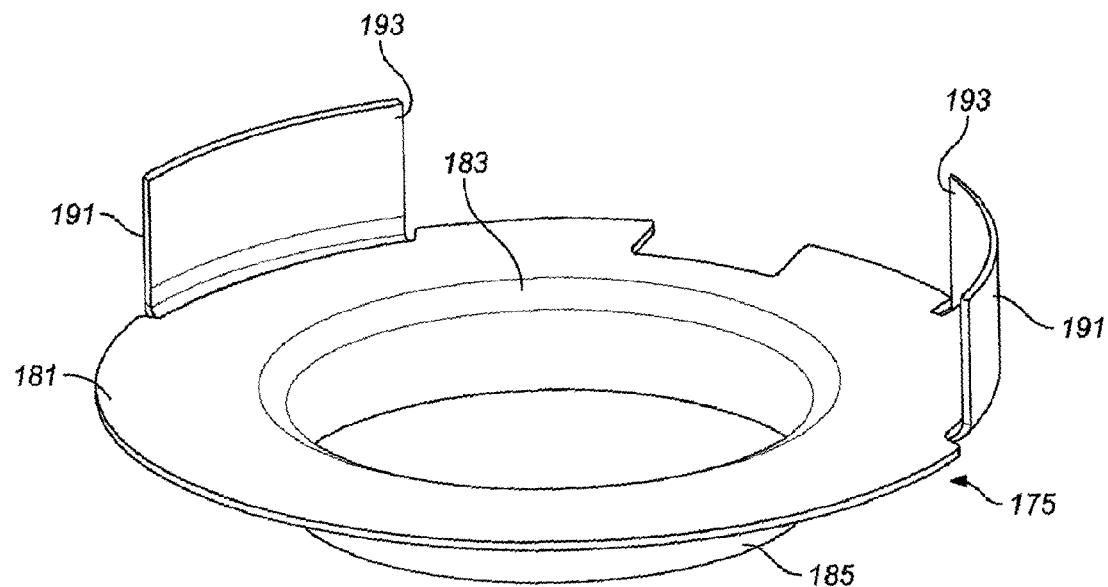
Figure 14B:
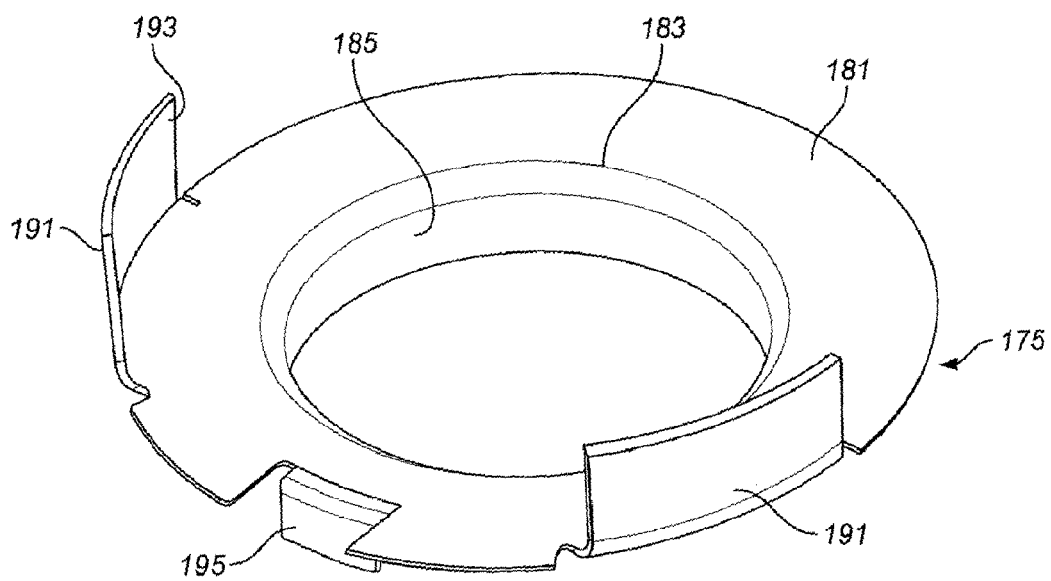
Figure 14C:
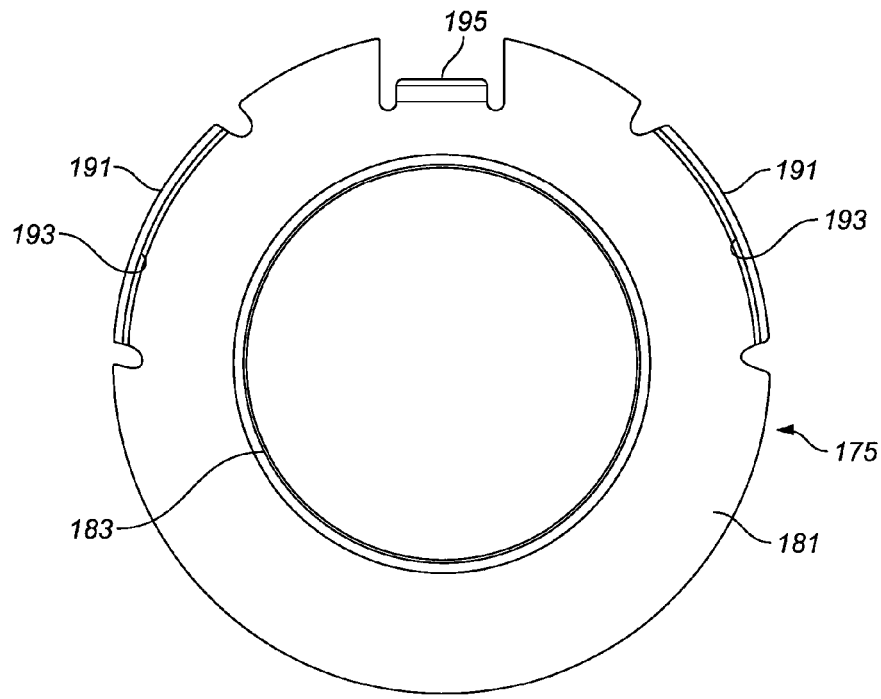
Figure 14D:
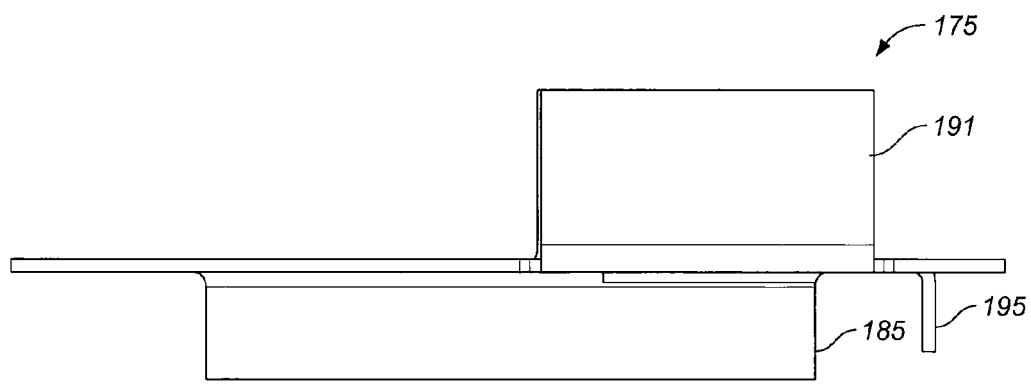

Referring particularly to FIGS. 13 to 15, in this embodiment the fins 87 each comprise a single, continuous sheet element 171, which includes a plurality of apertures 173 through which extend respective ones of the tube elements 93 of the tube sections 91 of the respective heat exchanger module 75a-d, and a plurality of fin coupling elements 175 which are located within each aperture 173 to interface the tube elements 93 of the tube sections 91 to the sheet elements 171, as will be described further hereinbelow.

By forming the fins 87 from a single, continuous sheet element 171, a uniform temperature distribution can be promoted over the length of the heat exchanger module 75a-d, in the sense of the flow direction of the heated gas flow through the housing 31.

In this embodiment the sheet element 171 is formed from stainless steel sheet having a thickness of 1 mm.

In this embodiment the apertures 173 each include a locator 177, here a cut-out, which acts to locate the rotational position of the respective fin coupling element 175 within the aperture 173.

In this embodiment the fin coupling elements 175 each comprise a body part 181 which is thermally connected to the sheet element 171 and includes an aperture 183 through which extends a respective one of the tube elements 93, and a flange 185 which extends from the body part 181 and around the aperture 183 therein and through the respective aperture 173 in the sheet element 171, and is thermally connected to the respective tube element 93.

In this embodiment the flange 185 comprises a tubular section, here having a length of at least 3 mm, which is a close fit to the outer diameter of the tube elements 93 of the tube sections 91.

By utilizing fin coupling elements 175 of the kind as described, fitting of the sheet elements 171 to the tube elements 93 of the tube sections 91 is facilitated, as the apertures 173 in the sheet elements 171 can be made greater than the outer diameter of the tube elements 93, which allows for relatively-free movement of the sheet elements 171 over the array of tube elements 93 to the required positions along the axial length of the tube elements 93, with fitting of the fin coupling elements 175 to a respective sheet element 171 only being required when the sheet element 171 is in the required axial position.

In addition, with this configuration, the flange 185, which is a close fit to the respective tube element 93, can have an extended length, which promotes thermal transfer between the tube element 93 and the sheet element 171.

In this embodiment the body part 181 has the form of a flat, annular part, in the manner of a thin washer, and the flange 185 extends in one direction orthogonally thereto.

In this embodiment the fin coupling elements 175 each further comprise at least one, here a plurality of projections 191 which extend in an opposite direction to the flange 185.

In this embodiment the projections 191 each comprise an upstand which extends in an opposite direction to the flange 185, and act to support the adjacent sheet element 171, as will be described in more detail hereinbelow.

With this configuration, the spacing d of the sheet elements 171 is set by the length of the projections 191, thus allowing the spacing d of the sheet elements 171 to be precisely controlled.

In this embodiment the projections 191 extend from an outer peripheral edge of the body part 181, which is spaced radially from the flange 185.

In this embodiment the projections 191 are located to one, rear side of the fin coupling element 175, in the sense of the gas flow direction through the housing 31, and present a forwardly-facing surface 193 which acts to disrupt the gas flow to the rear side of the respective tube element 93, here by causing a vortical flow, which is such as to promote heat transfer between the gas flow and the respective tube element 93.

In this embodiment the fin coupling element 175 includes a locator 195, here a lug, which is configured to locate with the locator 177 in the respective aperture 173 in the sheet element 171 of the fin 87, thereby locating the rotational position of the respective fin coupling element 175 within the aperture 173, and ensuring that the projections 191 on the fin coupling element 175 are located in the required orient relative to the tube element 93 as to promote heat transfer.

In one embodiment the locator 195 can include a detent, typically in the form of a clip, such as a spring clip, which acts to engage a surface of the sheet element 171, so as to prevent the fin coupling elements 175 from escaping from the apertures 173.

In this embodiment the fin coupling element 175 is coated at least partially with a brazing material, which allows for brazing of the fin coupling elements 175 to the tube elements 93 and the sheet element 171, thus avoid brazing material having to be provided separately where the fixing of the coupling elements 175 is by brazing. In an alternative embodiment separate rings of brazing material could be employed.

In one embodiment the fin coupling elements 175 are formed of stainless steel and coated with brazing material, in one embodiment with a thickness of less than 0.5 mm, optionally less than 0.3 mm, optionally less than 0.2 mm, optionally less than 0.1 mm. In one embodiment the coating has a thickness of about 0.2 um to about 50 um. The present inventors have found that these thin coatings of brazing material provide an excellent weld at the junctions with the tube elements 93 and the fin sheet elements 171, with the coating preferentially coalescing at the junctions. With this arrangement, a minimum amount of brazing material is required to achieve an excellent weld.

In one embodiment the coating of brazing material is of pure, oxygen-free copper.

In this embodiment the heat exchanger modules 75a-d are manufactured as follows.

In a first step, one outer support element 77 is located in a jig.

Then, the tube sections 91 are in turn located in the jig and arranged such that the tube elements 93 thereof extend in a required pattern through the apertures in the one support element 77, and such that the bends 96 of the tube sections 91 are located outwardly, here downwardly, of the one support element 77, with the elongate tube elements 93 of the tube sections 91 extending in parallel relation upwardly from the one support element 77.

Next, a fin coupling element 175 is located over each of the tube elements 93. This fin coupling element 175 acts as a spacer to space the first sheet element 171 from the one support element 77.

A sheet element 171 is then located over the tube elements 93, by passing the tube elements 93 through the respective apertures 173 in the sheet element 171. As the apertures 173 in the sheet element 171 have a greater diameter than the outer diameter of the tube elements 93, the sheet element 171 can be fitted relatively easily over the tube elements 93.

Next, a fin coupling element 175 is located over each of the tube elements 93, and the flange 185 of the fin coupling element 175 is located in the respective aperture 173 in the sheet element 171, with the locator 195 of the fin coupling element 175 being located in the locator 177 of the respective aperture 173 in the sheet element 171.

The steps of locating a sheet element 171 and fin coupling elements 175 are then repeated to build up a first stack of fins 87 along a length of the tube elements 93.

An intermediate support element 175 is located over each of the tube elements 93.

Next, a fin coupling element 175 is located over each of the tube elements 93. This fin coupling element 175 acts as a spacer to space the next sheet element 171 from the intermediate support element 81.

A sheet element 171 is then located over the tube elements 93, by passing the tube elements 93 through the respective apertures 173 in the sheet element 171. As the apertures 173 in the sheet element 171 have a greater diameter than the outer diameter of the tube elements 93, the sheet element 171 can be fitted relatively easily over the tube elements 93.

Next, a fin coupling element 175 is located over each of the tube elements 93, and the flange 185 of the fin coupling element 175 is located in the respective aperture 173 in the sheet element 171, with the locator 195 of the fin coupling element 175 being located in the locator 177 of the respective aperture 173 in the sheet element 171.

The steps of locating a sheet element 171 and fin coupling elements 175 are then repeated to build up a second stack of fins 87 along a length of the tube elements 93.

The steps of providing an intermediate support element 81 and subsequent sheet element 171 and fin coupling elements 175 are then repeated in dependence on the number of intermediate support elements 81, in this embodiment to provide three intermediate support elements 81.

In this embodiment formers 191, here formed of ceramic, are provided between the respective support elements 77, 81, as illustrated in FIG. 16. For ease of understanding, some of the formers 191 are omitted from the illustration in FIG. 16.

Next, a second outer support element 77 is located over the tube elements 93, by passing the tube elements 93 through the respective apertures in the other support element 77.

This core assembly is then vacuum brazed, which provides a very strong rigid matrix, with each of the tube elements 93 being fixed to each of the sheet elements 171, and the sheet elements 171 having a pre-defined spacing d.

Next, the pipe end couplings 103 are attached to the open ends 97 of the tube elements 93 of respective pairs of adjacent tube sections 91.

In this embodiment each pipe end coupling 103 is attached as follows.

In a first sub-step, the main body part 105 of each pipe end coupling 103 is located over the open ends 97 of the tube elements 93 of adjacent tube sections 91, such. that the open ends 97 of the tube elements 93 extend into the through bores 119, 121 in the main body part 105, and the open ends 97 of the tube elements 93 are expanded, in this embodiment by from about 4% to about 5%, such as to engage the grooves 131 in the respective through bores 119, 121.

In a second sub-step, the open ends 97 of the expanded tube elements 93 are each fixed to the respective upstands 135 of the through bores 119, 121, here by providing a weld in the channel defined by the external chamfer 101 on the open end 97 of the tube element 93 and the internal chamfer 137 in the upstand 135 of the respective through bore 119, 121.

In a third sub-step, the tube elements 93 are further expanded, in this embodiment by from about 4% to about 5%, such as further to engage the grooves 131 in the respective through bores 119, 121.

In a fourth sub-step, the effectiveness of the coupling of the tube elements 93 to the main body part 105 is tested using the testing tool 151, in the manner as described above.

In a fifth sub-step, where an effective coupling of the tube elements 93 to the main body part 105 is determined, the enclosure part 107 of the pipe end coupling 103 is fixed to the main body part 105, in this embodiment by providing an annular weld at the junction of the internal chamfer 127 of the main body part 105 and the external chamfer 149 of the enclosure part 107.

The steam generation module 11 further comprises a superheater unit 201 which is located at an upstream end thereof and upstream of the heat exchanger unit 69, and is operative further to raise the temperature of the received working fluid, in this embodiment saturated steam, to a temperature of from about 300° C. to about 400° C., preferably at a temperature of about 350° C., and with a pressure of up to 60 bar, thereby providing superheated fluid.

The superheater unit 201 comprises at least one superheater circuit 203, in this embodiment a plurality of superheater circuits 203a-d, which each comprise superheater pipework 205, and each has an input fluidly connected to the output of a respective one of the heat exchanger circuits 73a-d and an output from which a superheated fluid, in this embodiment superheated steam, is delivered.

In this embodiment the superheater pipework 205 comprises at least one, here plurality of coils 206, which accommodate longitudinal and lateral expansion.

In this embodiment the superheater coils 206 comprise a coil element, here a helically-wound coil, having an inlet and an outlet, which are located on the longitudinal axis thereof. In this embodiment the coil element is wound about the longitudinal axis.

With this symmetric configuration, the spring force caused by expansion of the coil 206 is uniform.

In this embodiment the coils 206 comprise slip couplings, here in the form of sleeves, which shroud the inlet and the outlet of the coil element, such as to protect the coil element from frictional engagement with support elements 211.

In this embodiment the superheater unit 201 comprises first and second support elements 211 which support the superheater pipework 205 of the superheater circuits 203a-d and are disposed in spaced relation and define a width of the superheater unit 201.

In this embodiment the support elements 211 each include a rail guide 215 at the lower edge thereof, which overlies a respective one of the rails 47 of the support 46 of the housing 31, such as to provide for sliding engagement with the rails 47.

In this embodiment the support elements 211 of the superheater unit 201 are formed from stainless steel sheet, here having a thickness of 6 mm.

In this embodiment the support elements 211 of the superheater unit 201 have the same spacing as the outer support elements 77 of the heat exchanger modules 75a-d of the heat exchanger unit 69.

In this embodiment, the coils 206 of the superheater circuits 203a-d extend in spaced, parallel relation between the support elements 211.

In this embodiment the superheater pipework 205 is formed of stainless steel tube, here having an external diameter of 19.05 mm and a wall thickness of 1.65 mm.

The steam generation module 11 further comprises an economizer unit 231, which is located in exhaust ducting downstream of the outlet 37 of the housing 31.

The economizer unit 231 comprises a coupling element 232, in this embodiment an annular flange coupling, by which the economizer unit 231 is fixed within the exhaust ductwork.

The economizer unit 231 comprises at least one economizer circuit 233, in this embodiment a plurality of pre-heater circuits 233a-d, which each comprise economizer pipework 235, and each has an input fluidly connected to the buffer tank 15 and an output from which the working fluid of raised temperature is delivered, in this embodiment to the pre-heater unit 61.

In this embodiment the economizer pipework 235 comprises a plurality of bent, U-shaped tube sections 241, having the same form and assembly as the tube sections 91 of the heat exchanger modules 75a-d, which each provide two spaced, parallel elongate tube elements 243, one ends 245 of which are continuously fluidly connected by a 180 degree radiused bend 246, and the other ends 247 of which are open and in spaced relation. In this embodiment the tube elements 243 extend axially along a length of the exhaust ductwork.

In this embodiment the economizer pipework 235 further comprises a plurality of tube end couplings 253, having the same form and assembly as the tube end couplings 103 of the heat exchanger modules 75a-d, which fluidly connect the open end 247 of one tube element 243 from each of two adjacent tube sections 241.

In this embodiment the economizer unit 231 further comprises at least one, here a plurality of support elements 251 which support the tube elements 243 within the exhaust ductwork.

In this embodiment the steam generation module 11 further comprises a pressure-relief valve (not illustrated) which provides for venting of the steam generation module 11 in the event of the system pressure exceeding a predetermined threshold, here 65 bar. In this embodiment the pressure relief valve is located downstream of the superheater unit 201.

Finally, it will be understood that the present invention has been described in its preferred embodiments and can be modified in many different ways without departing from the scope of the invention as defined by the appended claims.

For example, in the described embodiment, the steam generation unit 1 has been described in relation to an application for power generation, but the present invention has other application, such as in processing stations where the superheated steam is utilized directly, for example, in pasteurizing food or waste products.

The invention claimed is:

1. A heat exchanger assembly, comprising:
heat exchanger pipework which comprises a plurality of elongate tube elements which extend in spaced relation; and
a plurality of fins which extend in spaced relation, wherein the fins each comprise a sheet element which includes a plurality of apertures through which extend respective ones of the tube elements, and a plurality of fin coupling elements which are located within respective ones of the fin apertures to interface the tube elements to the sheet elements, wherein the fin coupling elements are fabricated separately of the sheet elements and each comprise a flange which extends through the respective fin aperture, and the fin coupling elements located within the fin apertures of one sheet element are separate of the fin coupling elements located within the fin apertures of other sheet elements, and wherein the fin apertures each include a first locator, and the fin coupling elements each include a second locator, which is configured to locate with the first locator in a respective one of the fin apertures, thereby locating the rotational position of the respective fin coupling element.

2. A heat exchanger assembly, comprising:
heat exchanger pipework which comprises a plurality of elongate tube elements which extend in spaced relation and a plurality of pipe end couplings which fluidly connect open ends of respective tube elements, wherein the pipe end couplings each comprise a main body part to which the open ends of the respective tube elements are fixed, and an enclosure part which is fixed to the main body part and provides a closed fluid connection between the open ends of the respective tube sections; and a plurality of fins which extend in spaced relation, wherein the fins each comprise a sheet element which includes a plurality of apertures through which extend respective ones of the tube elements, and a plurality of fin coupling elements which are located within respective ones of the fin apertures to interface the tube elements to the sheet elements.

3. The assembly of claim 2, wherein the main body part comprises a body, which includes a flange which encloses a surface, and first and second bores which extend to the surface and provide fluid communication thereto.

4. The assembly of claim 3, wherein the flange defines an annular seat to which the enclosure part is fixed.

5. The assembly of claim 4, wherein the flange defines an upstand, which extends around the seat, to which the enclosure part is fixed by an annular weld.

6. The assembly of claim 5, wherein the upstand includes an inwardly-inclined internal chamfer for receiving the weld.

7. The assembly of claim 3, wherein the bores each include at least one groove into which the open end of a respective one of the tube elements is expanded.

8. The assembly of claim 4, wherein the bores each terminate at an upstand which projects from the surface and to which the open end of the respective one of the tube elements is fixed by an annular weld.

9. The assembly of claim 8, wherein the upstand includes an inwardly-inclined internal chamfer, the open end of the respective tube element includes an outwardly-inclined annular chamfer, and the chamfers together define a channel for receiving the weld.

10. The assembly of claim 3, wherein the enclosure part includes an internal cavity which defines an arcuate surface having first and second bend radii, which are disposed opposite the bores in the main body part, thereby defining a 180 degree bend between the through bores.

11. The assembly of claim 10, wherein the enclosure part includes a flange, which extends around the internal cavity, to which the main body part is fixed by an annular weld.

12. The assembly of claim 11, wherein the flange of the enclosure part defines an outwardly-inclined external chamfer for receiving the weld.

13. The assembly of claim 11, wherein the flange defines an annular seat, which corresponds to an annular seat as defined by the flange of the main body part.

14. The assembly of claim 2, wherein the main body part and the enclosure part are formed of stainless steel.

15. The assembly of claim 14, wherein the main body part and the enclosure part are fabricated by casting.

16. The assembly of claim 1, wherein the sheet element has a thickness of at least about 1 mm.

17. A fin for a heat exchanger assembly, the fin comprising:

a plurality of tube elements;

a sheet element which includes a plurality of apertures through which extend respective ones of the tube elements; and a plurality of fin coupling elements which are fabricated separately of the sheet element and located within respective ones of the fin apertures to interface the tube elements to the sheet elements, wherein the fin coupling elements each comprise a body part which is thermally connected to the sheet element and includes an aperture through which extends a respective one of the tube elements, a flange which extends from the body part and through the respective fin aperture and is thermally connected to the respective tube element, and a plurality of projections which are disposed radially outwardly of the flange and located to one side of the fin coupling element, presenting a surface which acts to disrupt a gas flow to the one side of the fin coupling element, with the flange and the projections extending in opposite directions.

18. The assembly of claim 1, wherein the sheet elements are spaced by a spacing of at least 2 mm.

19. The assembly of claim 1, wherein the sheet elements are spaced by a spacing of at least 3 mm.

20. The assembly of claim 1, wherein the fin coupling elements each comprise a body part which is thermally connected to a respective one of the sheet elements and includes an aperture through which extends a respective one of the tube elements, and a flange which extends from the body part and through the respective fin aperture and is thermally connected to the respective tube element.

21. The assembly of claim 20, wherein the flange comprises a tubular section which is a close fit to an outer dimension of the tube elements.

22. The assembly of claim 20, wherein the flange has a length of at least 3 mm.

23. The assembly of claim 20, wherein the body part has the form of a flat, annular part.

24. The assembly of claim 20, wherein the fin coupling elements each further comprise one or more projections.

25. The assembly of claim 24, wherein the one or more projections are disposed radially outwardly of the flange.

26. The assembly of claim 25, wherein the one or more projections extend from an outer peripheral edge of the body part.

27. The assembly of claim 25, wherein the flange and the one or more projections extend in opposite directions.

28. The assembly of claim 27, wherein the one or more projections have a length which acts to space the adjacent sheet element.

29. The assembly of claim 1, wherein the fin coupling elements each comprise a plurality of projections, which are located to one side of the fin coupling element, and present a surface which acts to disrupt a gas flow to the one side of the fin coupling element.

30. The assembly of claim 1, wherein the fin coupling elements are coated at least partially with a brazing material, which allows for brazing of the fin coupling elements to the tube elements and the sheet elements.

31. The fin of claim 17, wherein the flange comprises a tubular section which is a close fit to an outer dimension of the tube elements.

32. The fin of claim 17, wherein the body part has the form of a flat, annular part.

33. The fin of claim 17, wherein the projections extend from an outer peripheral edge of the body part.

34. The fin of claim 17, wherein the projections have a length which acts to space the adjacent sheet element.

35. The fin of claim 17, wherein the fin coupling elements are coated at least partially with a brazing material.

* * * * *